US012491613B2

(12) United States Patent
Moriwaki et al.

(10) Patent No.: US 12,491,613 B2
(45) Date of Patent: Dec. 9, 2025

(54) DRIVING TOOL

(71) Applicant: Max Co., Ltd., Tokyo (JP)

(72) Inventors: Kousuke Moriwaki, Tokyo (JP); Yoshihiko Kondou, Tokyo (JP); Hiroyuki Takahashi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/393,530

(22) Filed: Dec. 21, 2023

(65) Prior Publication Data

US 2024/0208019 A1 Jun. 27, 2024

(30) Foreign Application Priority Data

Dec. 22, 2022 (JP) ................................. 2022-205694

(51) Int. Cl.
*B25C 1/00* (2006.01)
*B25C 1/04* (2006.01)

(52) U.S. Cl.
CPC .............. *B25C 1/008* (2013.01); *B25C 1/047* (2013.01)

(58) Field of Classification Search
CPC ......... B25C 1/008; B25C 1/047; B25C 1/043; B25C 1/06; B25C 1/046; B25C 1/04; B25C 1/042
See application file for complete search history.

(56) References Cited

U.S. PATENT DOCUMENTS

2019/0099871 A1 4/2019 Fukushima et al.
2019/0375083 A1 * 12/2019 Ishikawa .................. B25C 7/00

FOREIGN PATENT DOCUMENTS

EP 3156180 A1 4/2017
EP 3461592 A1 4/2019
JP 2019-063928 A 4/2019

OTHER PUBLICATIONS

Apr. 3, 2024—(EP) Extended EP Search Report—EP App 23219246.8.

* cited by examiner

*Primary Examiner* — Veronica Martin
(74) *Attorney, Agent, or Firm* — Banner & Witcoff, Ltd.

(57) ABSTRACT

There is provided a driving tool for driving a fastener to a fastening target object including: a contact arm capable of moving in a first direction by being brought into contact with and pressed against the fastening target object; a driving portion configured to start a driving operation of the fastener on condition that the contact arm moves by a predetermined amount in the first direction; and a restricting portion configured to restrict the driving operation performed by the driving portion when an inertial force is generated in the first direction.

10 Claims, 23 Drawing Sheets

DRIVING TOOL

CROSS-REFERENCE TO RELATED APPLICATIONS

This application is based on and claims priority under 35 USC 119 from Japanese Patent Application No. 2022-205694 filed on Dec. 22, 2022, the contents of which are incorporated herein by reference.

TECHNICAL FIELD

The present disclosure relates to a driving tool for driving a fastener to a fastening target object.

BACKGROUND ART

A driving tool for driving a fastener such as a nail or a pin to a building member such as wood, a steel plate, or concrete is widely known. In such a driving tool, a driver is driven by using compressed air, gas combustion pressure, a spring force, or the like, and the fastener is driven by the driver.

As such a driving tool, there is a driving tool including a safety device called a contact arm (see, for example, JP2019-063928A). The contact arm is provided in a manner of protruding from a tip end of a nose portion, and can be pushed in a counter-protruding direction. When the contact arm (the nose portion) is brought into contact with and is pressed against a fastening target object, the contact arm is pushed in, and a sign on state in which the fastener can be driven is obtained. If the contact arm is not in the sign on state, a driving operation cannot be performed even when a trigger lever is operated. That is, the fastener is not driven unless the contact arm is pressed against the fastening target object.

During using the driving tool including the contact arm, if a cylinder cap top surface (a surface opposite to the nose) hits against a member or the like unintentionally, an inertial force that causes the contact arm to move in an operation direction (the counter-protruding direction) is generated. In order to prevent the contact arm from being brought into the sign on state by such an inertial force, in the related art, a load of a biasing member for biasing the contact arm in a non-operation direction is set to be high, and thus the contact arm does not move even when the inertial force is generated. However, when the load of the biasing member is set to be high, a pressing load of the contact arm increases during normal use, and thus there is a problem that a burden is imposed on an operator and usability is deteriorated.

In a case of a driving tool that drives a piston with compressed air, by slowing down a reaction of a main valve that supplies compressed air to the piston, a fastener can be prevented from being driven within a time during which the contact arm is operated due to the inertial force. However, when the reaction of the main valve is slowed down, there is a problem that operation feeling for driving is poor during normal use, which leads to a reduction in working efficiency.

SUMMARY OF INVENTION

The present disclosure provides a driving tool capable of ensuring safety without increasing a biasing load of a contact arm or slowing down a reaction of a main valve even when an inertial force which causes the contact arm to move in an operation direction is generated.

According to an illustrative aspect of the present disclosure, a driving tool for driving a fastener to a fastening target object includes: a contact arm capable of moving in a first direction by being brought into contact with and pressed against the fastening target object; a driving portion configured to start a driving operation of the fastener on condition that the contact arm moves by a predetermined amount in the first direction; and a restricting portion configured to restrict the driving operation performed by the driving portion when an inertial force is generated in the first direction.

As described above, the present disclosure includes a restricting portion that restricts a driving operation performed by a driving portion when the inertial force is generated in a first direction. Accordingly, safety of the driving tool can be ensured without increasing a spring load of the contact arm or slowing down the reaction of the main valve even when the inertial force that causes the contact arm to move in the operation direction is generated.

BRIEF DESCRIPTION OF DRAWINGS

FIGS. 13A to 13D are diagrams each illustrating the first modification, in which FIG. 13A is a perspective view of a rotation restricting member, FIG. 13B is a plane view of the rotation restricting member, FIG. 13C is a front view of the rotation restricting member, and FIG. 13D is a side view of the rotation restricting member;

FIGS. 16A to 16D are diagrams each illustrating a second modification, in which FIG. 16A is a perspective view of a rotation restricting member, FIG. 16B is a plane view of the rotation restricting member, FIG. 16C is a front view of the rotation restricting member, and FIG. 16D is a side view of the rotation restricting member;

FIGS. 23A and 23B are each partially enlarged views of a lock valve portion used for describing the third modification, in which FIG. 23A is a diagram obtained when the inertial force is not generated in the first direction, and FIG. 23B is a diagram obtained when the inertial force is generated in the first direction.

DESCRIPTION OF EMBODIMENTS

An embodiment of the present disclosure will be described with reference to the drawings.

Figure 1:
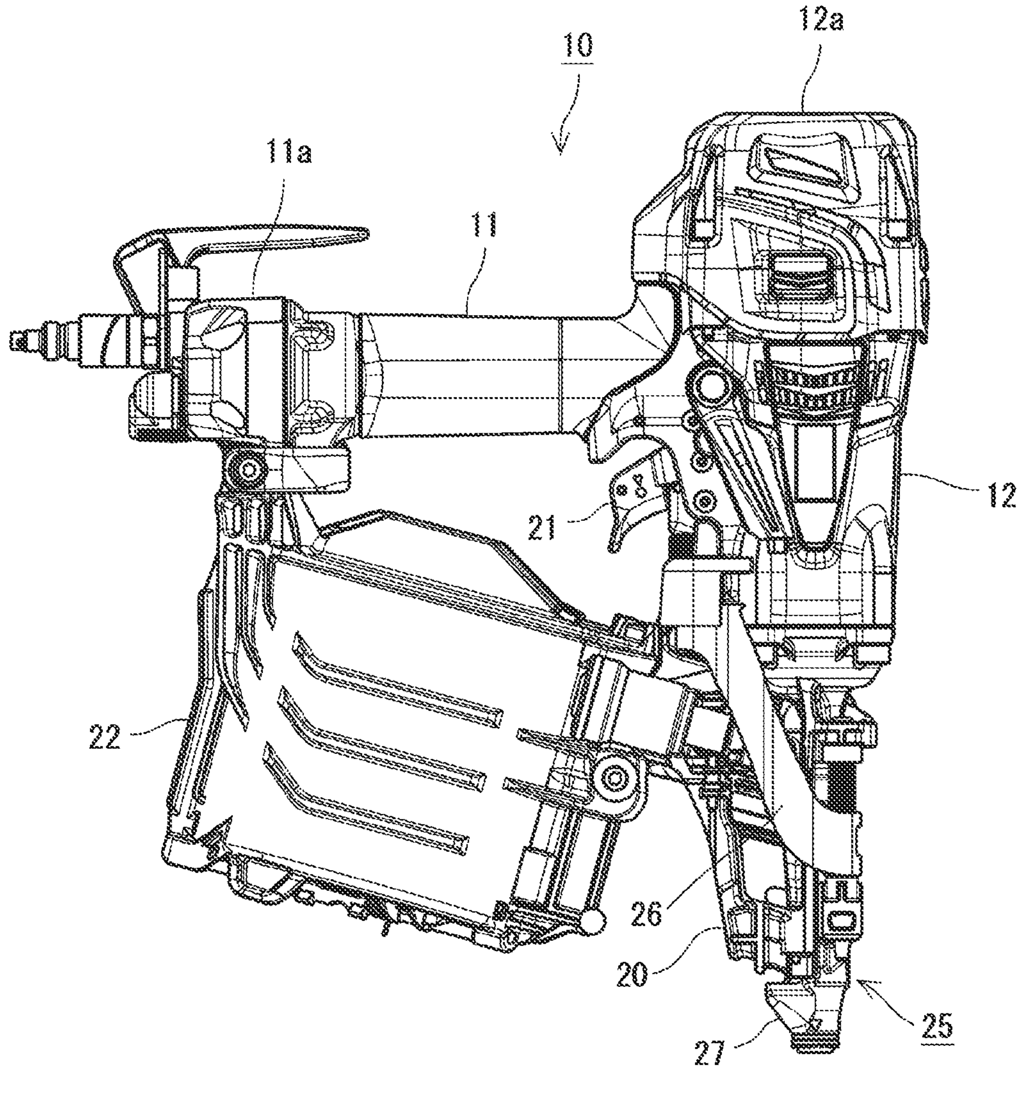
FIG. 1 is an external view of a driving tool.

A driving tool 10 according to the present embodiment is a hand-held tool that drives a fastener to a fastening target object. As illustrated in FIG. 1, the driving tool 10 includes a body housing 12, a grip housing 11, a trigger lever 21, a magazine 22, a nose portion 20, and a contact portion 25. In the following description, a direction in which the fastener is ejected is referred to as a downward direction, and a direction opposite to the downward direction is referred to as an upward direction (a "first direction" in the claims).

The body housing 12 is formed in a substantially cylindrical shape and incorporates a driving portion 13 that performs a driving operation of a fastener. The driving tool 10 according to the present embodiment incorporates the air pressure type driving portion 13 that ejects a fastener by a pressure of compressed air. The driving portion 13 is merely an example, and the driving portion 13 may include another power source (for example, one that operates with a gas combustion pressure, or one that operates with a motor or a spring).

Figure 2:
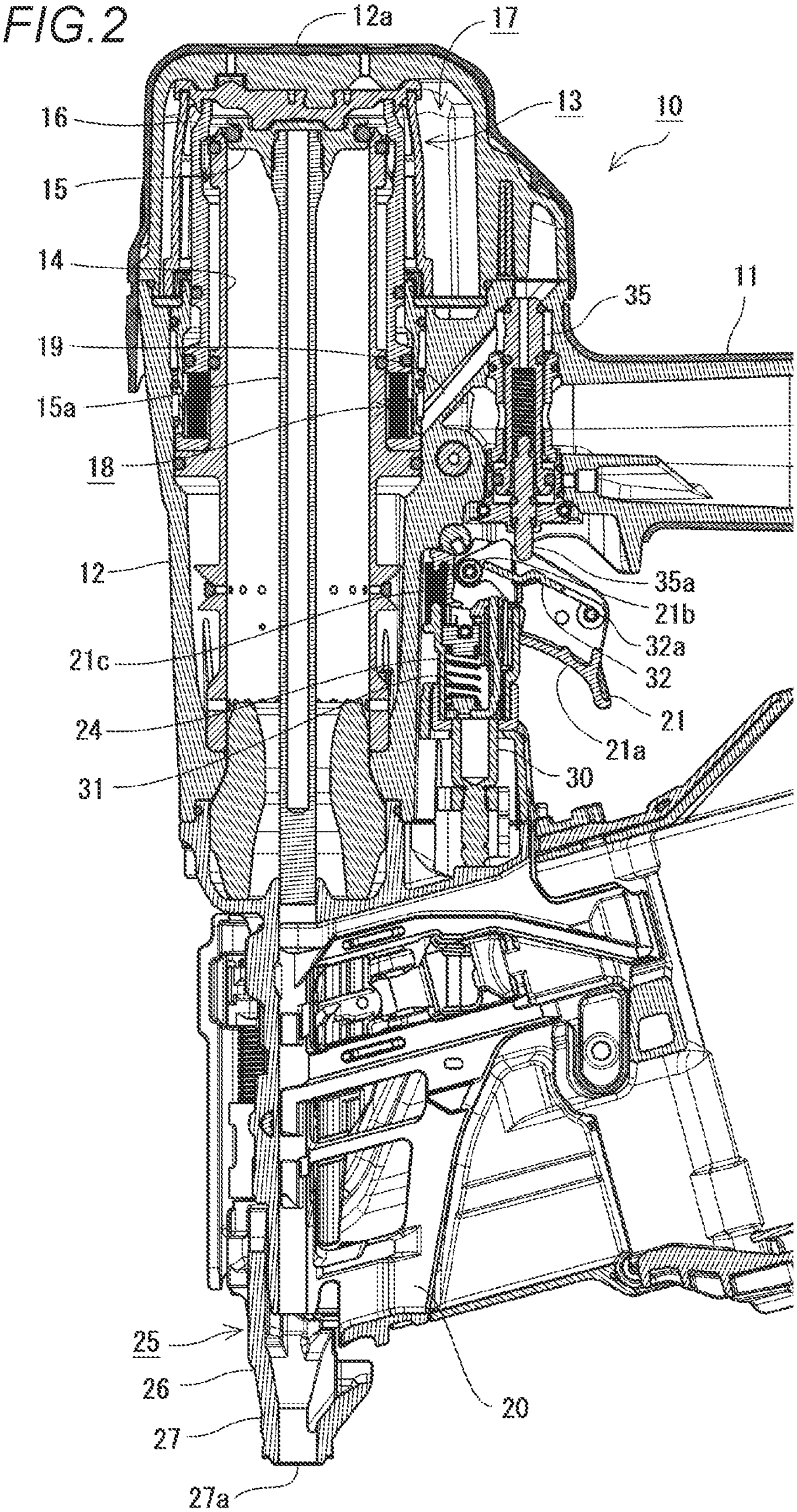
FIG. 2 is a partially enlarged view of the driving tool.

The driving portion 13 is a portion that generates a driving force for the driving operation. The driving portion 13 activates on condition of being in a sign on state, which will be described later. In other words, the driving portion 13 does not activate unless being in the sign on state. As illustrated in FIG. 2, the driving portion 13 includes a cylinder 14, a piston 15, and a driver 15*a*. Specifically, the piston 15 is slidably accommodated in the cylinder 14 which has a cylindrical shape, and the driver 15*a* that strikes a fastener is coupled to a lower surface of the piston 15. When compressed air is supplied to an upper surface of the piston 15 in the cylinder 14, the piston 15 moves downward in an impact manner, and the fastener is ejected downward by the driver 15*a* that operates integrally with the piston 15.

The driving portion 13 includes a main valve portion 16, a main chamber 17, an air chamber 18, an air flow path 19, and a pilot valve 35.

The main chamber 17 is a space in which compressed air supplied from the outside is stored. The main chamber 17 communicates with the inside of the grip housing 11. The compressed air stored in the main chamber 17 is supplied to the cylinder 14 to operate the piston 15.

Figure 21:
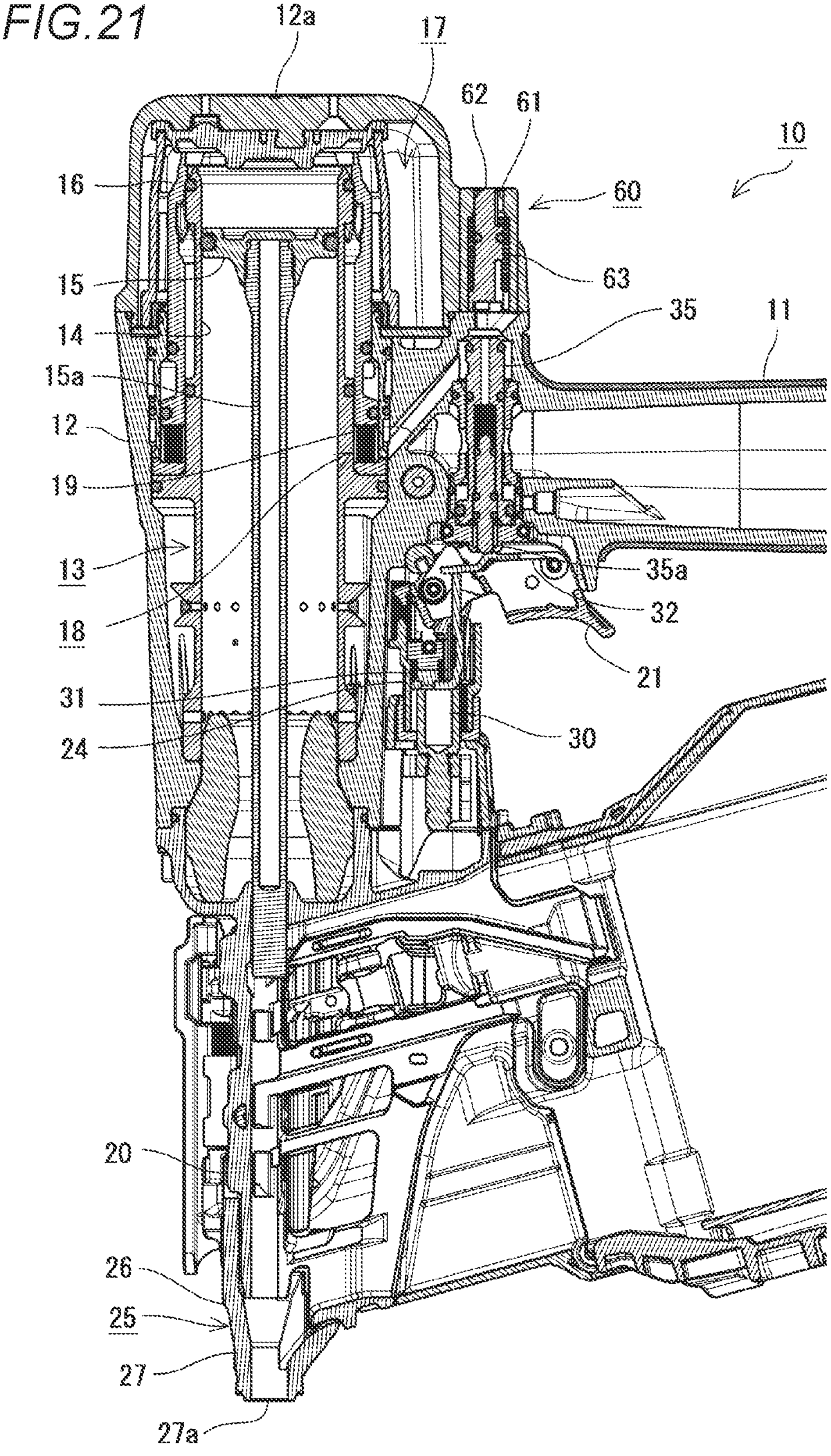
FIG. 21 is a partially enlarged view of the driving tool used for describing the third modification, which is a diagram when a main valve portion is operated.

The main valve portion 16 controls the supply of compressed air to the cylinder 14. The main valve portion 16 is a tubular component provided in a manner of covering the vicinity of an upper end of the cylinder 14, and is disposed in a manner of being vertically movable along an axial direction of the cylinder 14. In a state of waiting for the driving of a fastener, the main valve portion 16 waits at the upper portion, and blocks an internal space of the cylinder 14 in a manner of not allowing the communication with the main chamber 17 as illustrated in FIG. 2. Then, when driving the fastener, the main valve portion 16 moves downward as illustrated in FIG. 21, and allows the communication between the main chamber 17 and the internal space of the cylinder 14. When the main chamber 17 and the internal space of the cylinder 14 are allowed to communicate with each other, compressed air in the main chamber 17 is supplied to the upper surface of the piston 15 in the cylinder 14, and the piston 15 is driven.

The air chamber 18 is a space capable of storing compressed air in order to generate a pressure in a direction in which the main valve portion 16 is closed. In a state in which compressed air is stored in the air chamber 18, the main valve portion 16 is pushed upward by the compressed air stored in the air chamber 18 and a compression spring. At this time, a force that pushes the main valve portion 16 downward due to compressed air stored in the main chamber 17 also acts on the main valve portion 16, but an area where the compressed air acts is larger on an air chamber 18 side than on a main chamber 17 side, and thus the main valve portion 16 is pushed upward due to a pressure difference. On the other hand, in a state in which compressed air is not stored in the air chamber 18 (a state in which an air pressure in the air chamber 18 is equal to an outside air pressure), the main valve portion 16 moves downward due to the pressure of the compressed air stored in the main chamber 17.

The air flow path 19 is a passage that allows the air chamber 18 to communicate with the outside of the driving tool 10. The air flow path 19 allows the communication with the outside through an exhaust port opened in a surface of the body housing 12. The pilot valve 35 to be described later is disposed in an intermediate portion of the air flow path 19.

The pilot valve 35 is a valve capable of opening and closing the air flow path 19. A valve stem 35*a* is slidably disposed inside the pilot valve 35. The valve stem 35*a* is biased in a protruding direction (downward) in a natural state in which the trigger lever 21 is not operated, and a lower end of the valve stem 35*a* faces a contact lever 32 to be described later. In this natural state, the pilot valve 35 acts to close the air flow path 19. In this state, the air chamber 18 is blocked from the outside, and compressed air is stored in the air chamber 18. On the other hand, when the valve stem 35*a* is pushed upward, the pilot valve 35 acts to open the air flow path 19. When the air flow path 19 is opened, the compressed air in the air chamber 18 is discharged to the outside, the pressure is reduced, and the main valve portion 16 operates. That is, the pilot valve 35 is for controlling the activation of the driving portion 13, and the pilot valve 35 opens the air flow path 19 to start a single driving operation. The pilot valve 35 can open the air flow path 19 only when the trigger lever 21 to be described later is operated (pulled) and the contact portion 25 is in the sign on state.

The pilot valve 35 also has a function of communicating or blocking the main chamber 17 and the air chamber 18, but the pilot valve 35 is a known configuration, and a description is omitted.

The grip housing 11 is a rod-like portion when an operator grips when the driving tool 10 is used. The grip housing 11 is connected to the body housing 12 at a substantially right angle. An internal space of the grip housing 11 functions as a part of the main chamber 17 and stores compressed air. An air plug for supplying compressed air from the outside to the main chamber 17 is provided at a rear end (a grip end 11*a*) of the grip housing 11.

The trigger lever 21 is an operation lever provided to be operable to open and close the pilot valve 35. The operator can drive the fastener by operating the trigger lever 21. The trigger lever 21 is provided at a position operable for a hand gripping the grip housing 11. Specifically, when the operator grips the grip housing 11, the trigger lever 21 is disposed at a position where an index finger is hooked (below the vicinity of a front end of the grip housing 11), and the trigger lever 21 can be pulled and operated by the index finger. When the trigger lever 21 is operated in the sign on state to be described later, the contact lever 32 disposed inside the trigger lever 21 pushes the valve stem 35*a* of the pilot valve 35 upward. When the valve stem 35*a* is pushed upward, the driving portion 13 operates as described above, and the fastener is driven.

In the trigger lever 21, a lower surface on which the index finger is hooked is a finger hooking portion 21*a*. The trigger lever 21 is rotatably attached to the body housing 12 with a trigger rotation shaft 21*b* disposed in the vicinity of the front end as a shaft. The trigger lever 21 is constantly biased downward by a trigger biasing member 21*c*.

The magazine 22 is for storing coupled fasteners in which a plurality of fasteners are coupled. The coupled fasteners stored in the magazine 22 are sequentially supplied to the nose portion 20 to be described later, and a leading fastener is held in a manner of being positioned immediately below the driver 15*a*.

The nose portion 20 is a portion provided integrally with a lower end of the body housing 12. A fastener supply mechanism is provided at the rear of the nose portion 20, and the fastener supply mechanism operates in conjunction with the driving operation to automatically supply the fasteners stored in the magazine 22 one by one to the nose portion 20.

An ejection path for guiding ejection of the fastener is formed inside the nose portion 20. The fastener supplied by the fastener supply mechanism waits in the ejection path. When the driver 15*a* slides towards the nose portion 20 through the ejection path, the driver 15*a* hits the fastener, and the fastener waiting in ejection path is ejected from the tip end of the nose portion 20.

Figure 5:
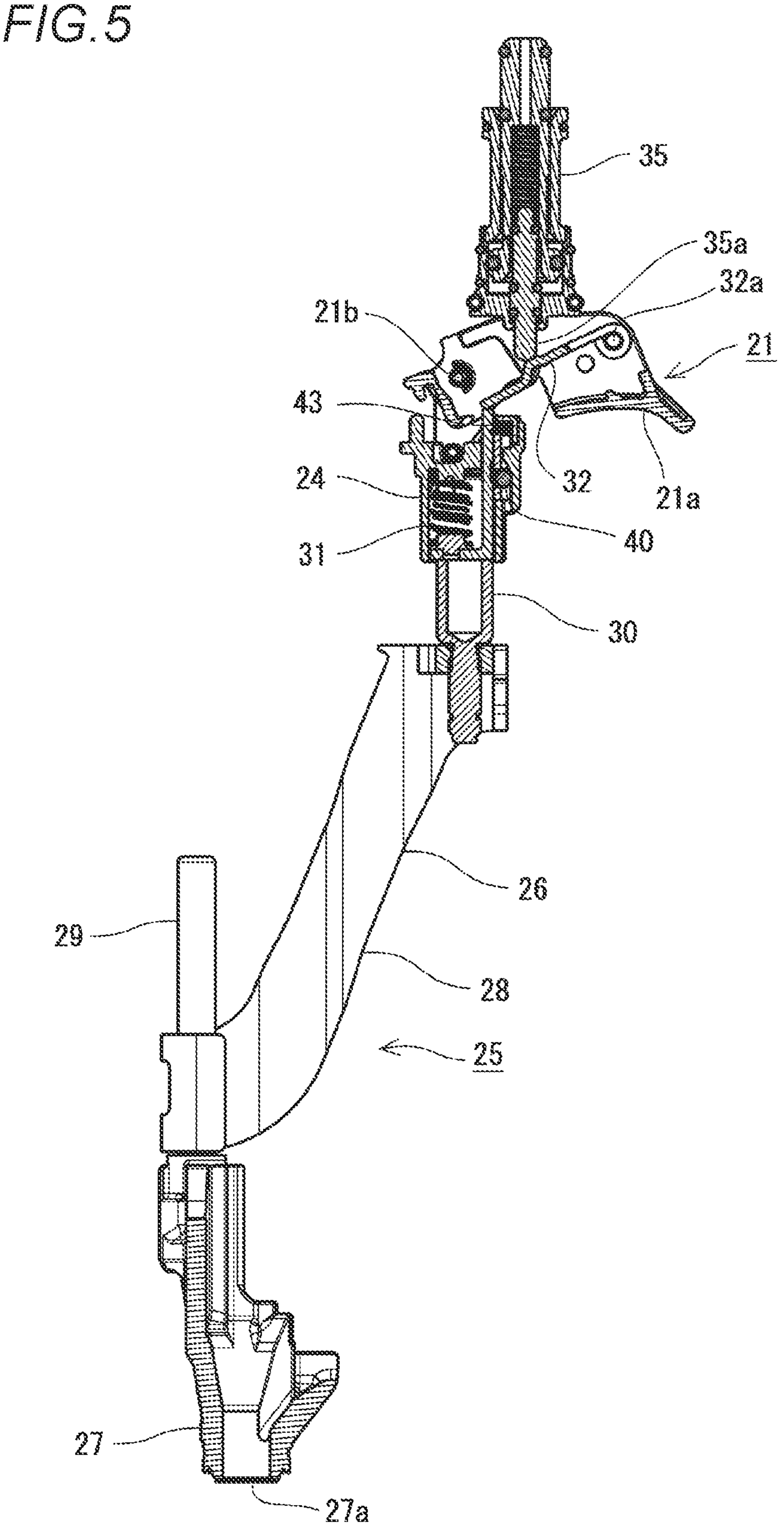
FIG. 5 is a partial cross-sectional view illustrating a structure of a contact arm.

The contact portion 25 is a safety mechanism for preventing an accident in which the fastener is ejected in the air. If the contact portion 25 is not brought into the sign on state, the fastener is not ejected even if the trigger lever 21 is operated. As illustrated in FIG. 5, the contact portion 25 according to the present embodiment includes a contact arm 26 and the contact lever 32.

The contact arm 26 is vertically slidable with respect to the nose portion 20, and is biased downward by a contact spring 31. The contact arm 26 includes a tip end (a contact nose 27 described later) protruding downward relative to the nose portion 20, and is movable upward (in the first direction) by bringing the tip end into contact with the fastening target object and pressing the tip end. When the contact arm 26 is pushed upward, the safety mechanism is released and the fastener can be driven. Specifically, when the contact arm 26 is pushed upward, the contact lever 32 is brought into a state of being engageable with the valve stem 35*a* (a state in which the safety mechanism is released), and if the trigger lever 21 is operated in this state (or if the safety mechanism is released in a state in which the trigger lever 21 is operated), the driving portion 13 operates to eject the fastener. On the other hand, in a state in which the contact arm 26 is not pushed upward (a state in which the contact arm 26 is biased by the contact spring 31 and protrudes downward), the safety mechanism disables the operation of the trigger lever 21, and the fastener cannot be ejected even if the trigger lever 21 is operated. Specifically, in the state in which the contact arm 26 is not pushed upward, the contact lever 32 is in a state in which the valve stem 35*a* is not pushed up (a state in which the safety mechanism operates), and thus the driving portion 13 does not operate and the fastener cannot be ejected even if the trigger lever 21 is operated.

The contact arm 26 is implemented by combining a plurality of components, and includes the contact nose 27, an arm portion 28, a connection shaft 29, and a lever pressing portion 30.

The contact nose 27 is a portion provided at a lower end of the contact arm 26. The contact nose 27 is attached in a manner of covering the tip end of the nose portion 20. The contact nose 27 includes a cylindrical guide path, and the guide path communicates with the ejection path of the nose portion 20. Therefore, the fastener ejected from the tip end of the nose portion 20 passes through the contact portion 25 and is driven in the fastening target object. In other words, an opening of a tip end of the contact portion 25 serves as an ejection port 27*a* of the fastener.

The arm portion 28 is a portion coupled to the contact nose 27 and extending upward along side surfaces of the nose portion 20. The arm portion 28 extends to the vicinity of the trigger lever 21. The arm portion 28 couples the contact nose 27 and the lever pressing portion 30, and integrally moves the contact nose 27 and the lever pressing portion 30 up and down.

The connection shaft 29 is a member for connecting the contact nose 27 and the arm portion 28. The connection shaft 29 may be a screw, and the protruding amount of the contact nose 27 may be adjusted by a screw action of the connection shaft 29. For example, by rotating the connection shaft 29, the contact nose 27 may move up and down, and the protruding amount of the contact portion 25 with respect to the nose portion 20 may change. A mechanism for adjusting a protruding amount of the contact nose 27 may be provided at an upper end of the arm portion 28 (a connection position between the lever pressing portion 30 and the arm portion 28 to be described later) instead of a lower end of the arm portion 28.

The lever pressing portion 30 is a portion provided at an upper end of the contact arm 26. The lever pressing portion 30 is supported by a support portion 24 provided in the body housing 12 to be movable in an upper-lower direction (vertically). A downward surface formed in the support portion 24 and an upward surface formed in the lever pressing portion 30 face each other, and the contact spring 31 is disposed between the two surfaces. The contact spring 31 constantly biases the lever pressing portion 30 (the contact arm 26) downward. In other words, the contact nose 27 is constantly biased downward by the contact spring 31.

The lever pressing portion 30 includes a pressing piece 30*a* protruding toward a lower surface of the contact lever 32. In a natural state, the lever pressing portion 30 (the contact arm 26) is biased downward by the contact spring 31, and thus the lever pressing portion 30 does not push up the contact lever 32. This state is a sign off state. By pressing the contact arm 26 against the fastening target object from this state, the contact arm 26 moves upward against a biasing force of the contact spring 31. A state in which the contact arm 26 moves upward by a predetermined amount is the sign on state. In the sign on state, the pressing piece 30*a* can push the contact lever 32 upward.

Figure 3:
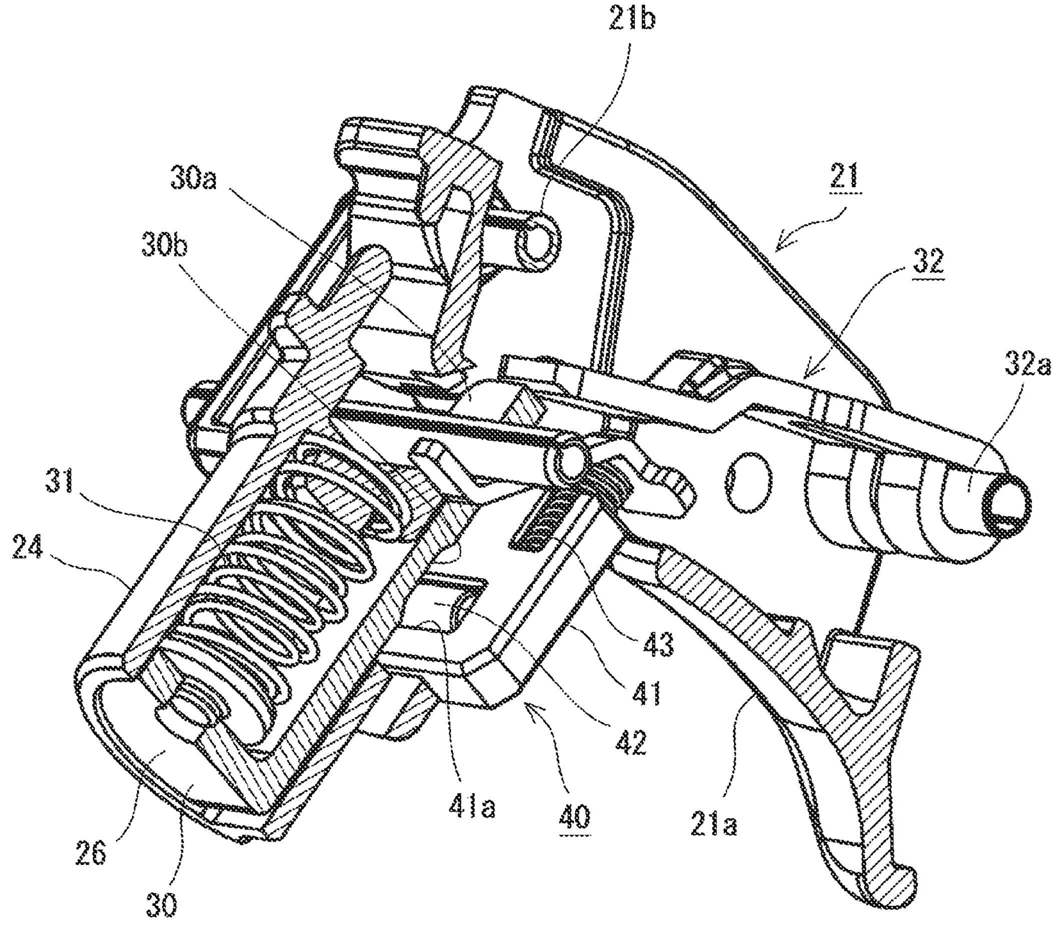
FIG. 3 is a partial cross-sectional view of a vicinity of a trigger lever.
Figure 4:
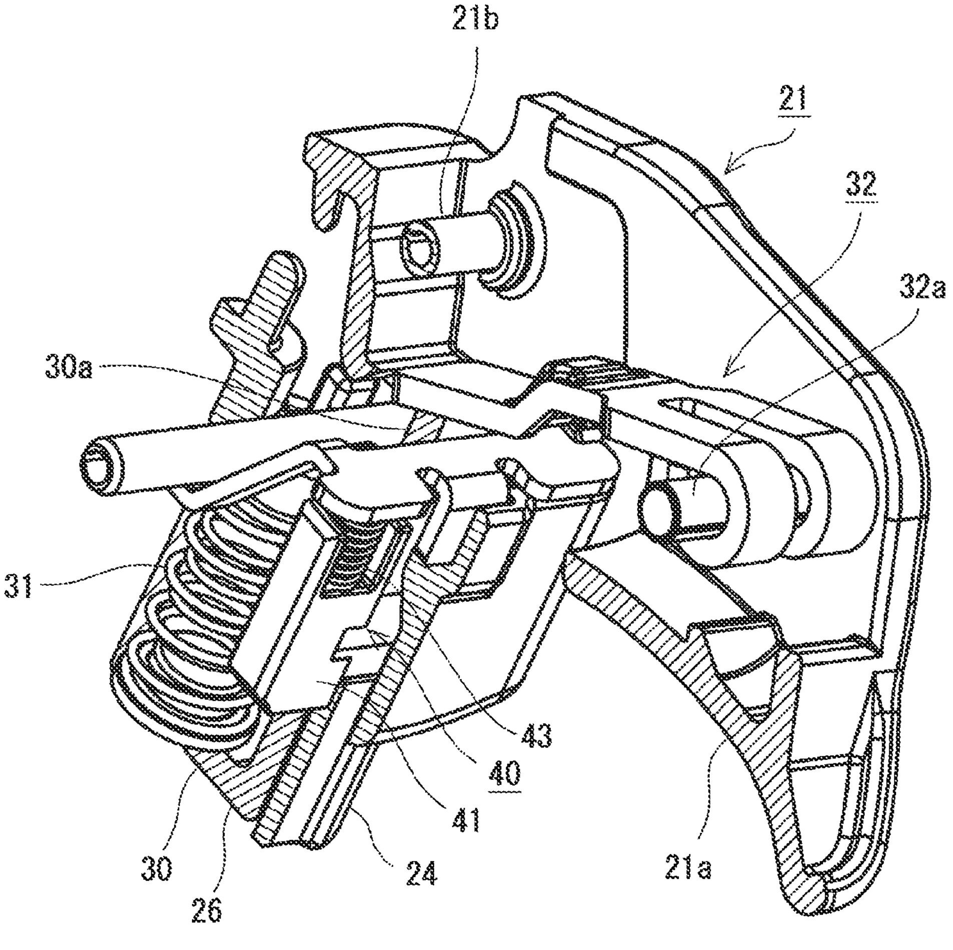
FIG. 4 is a partial cross-sectional view of the vicinity of the trigger lever viewed from another angle.

The contact lever 32 is a member disposed in a manner of pushing the valve stem 35*a* of the pilot valve 35 when the trigger lever 21 is pulled in the sign on state. As illustrated in FIGS. 3 and 4, the contact lever 32 is rotatably attached inside the trigger lever 21 via a rotation shaft 32*a* provided at one end of the contact lever 32. An upper surface of the contact lever 32 is disposed in a manner of facing the valve stem 35*a*, and the valve stem 35*a* can be pressed on the upper surface near the center. The contact lever 32 pushes the valve stem 35*a* upward when both ends are lifted up simultaneously. On the other hand, the valve stem 35*a* is not pushed upward even if only one end of the contact lever 32 is lifted upward.

Here, one end of the contact lever 32 is coupled to the trigger lever 21, and is lifted upward when the trigger lever 21 is pulled. The other end of the contact lever 32 is disposed in a manner of facing the pressing piece 30*a*, and is lifted upward by the pressing piece 30*a* when the contact arm 26 is in a state of moving upward by a predetermined amount (in the sign on state). That is, when the trigger lever 21 is pulled and the contact arm 26 is in the sign on state, both ends of the contact lever 32 are simultaneously lifted up and the valve stem 35*a* is pushed in. Therefore, even if the trigger lever 21 is operated without pressing the contact arm 26 against the fastening target object, the fastener is not ejected.

In the present embodiment, when the contact arm 26 operates, the contact lever 32 is pushed up. However, another mechanism may be used as a mechanism for preventing erroneous operation of driving by the contact arm 26. For example, a microswitch may be pressed by the contact arm 26. In this case, a state in which the microswitch is pressed is the sign on state, and a state in which the microswitch is not pressed is the sign off state.

When the driving tool 10 moving upward is stopped, an upward inertial force is generated on the contact arm 26. In other words, when the movement of the driving tool 10 moving upward is restricted, an upward inertial force is generated on the contact arm 26. For example, if an upper surface 12*a* of the body housing 12 hits against a member or the like unintentionally during using the driving tool 10 as described above, an inertial force that causes the contact arm 26 to move in an operation direction (in an arrow direction illustrated in FIG. 8) is generated. In order to prevent the contact arm 26 from being brought into the sign on state by such an inertial force, in the related art, a load of the contact spring 31 is set to be high to make the contact arm 26 does not move even if an inertial force is generated. However, when the load of the contact spring 31 is set to be high, a pressing load of the contact arm 26 increases during normal use, and thus there is a problem that a burden is imposed on an operator and usability is deteriorated.

If a reaction of the main valve portion 16 that supplies compressed air to the piston 15 is slowed down, the fastener can also be prevented from being driven within a time during which the contact arm 26 operates due to the inertial force. However, if the reaction of the main valve portion 16 is slowed down, there is a problem that the operation feeling for driving is poor during normal use, which leads to a reduction in working efficiency.

Therefore, the driving tool 10 according to the present embodiment includes a slide portion 40 (a movable portion) that starts moving independently of the contact portion 25 when an inertial force is generated upward (in the first direction). If the slide portion 40 moves when the inertial force is generated upward, the driving portion 13 is brought into a non-driving state in which the driving portion 13 does not operate.

Figure 7:
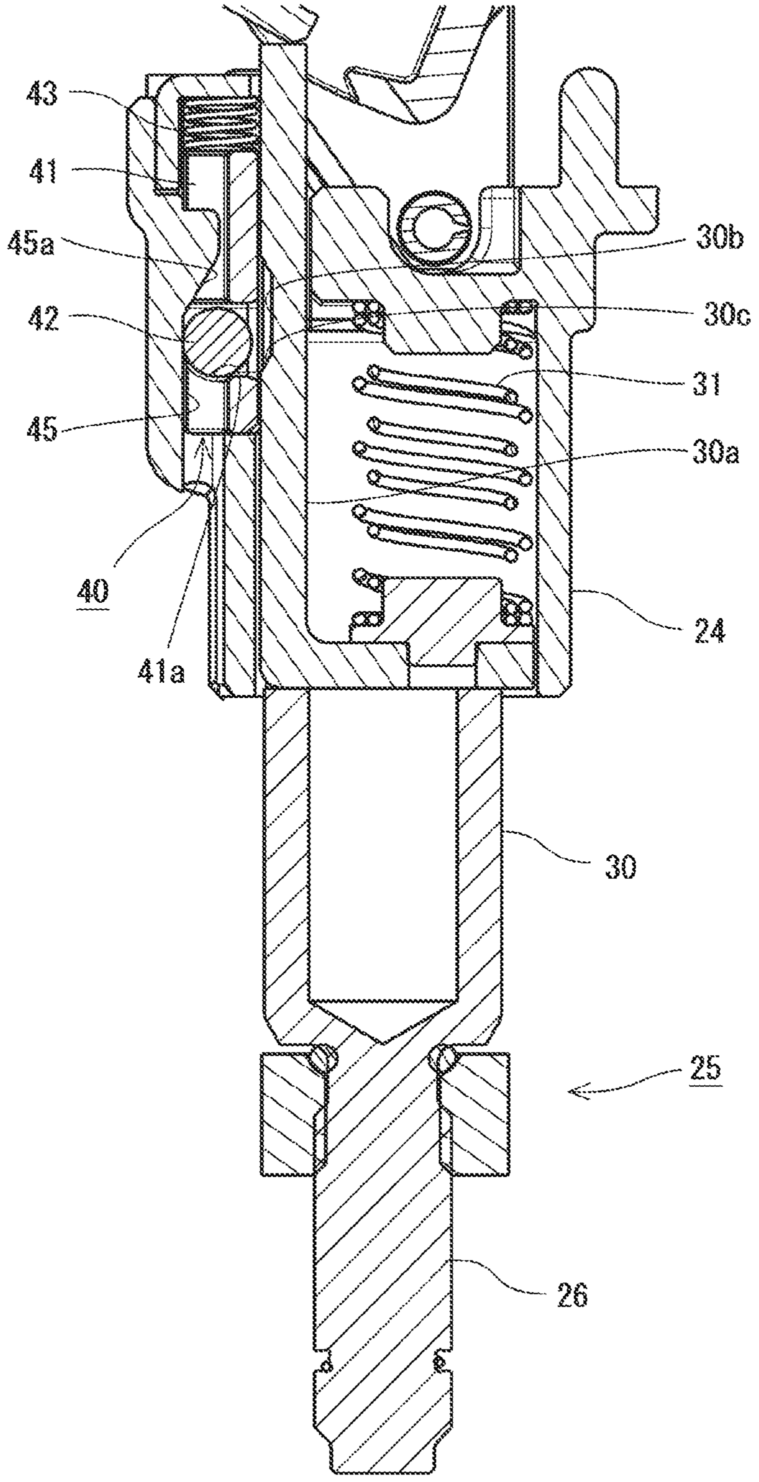
FIG. 7 is an enlarged view of a portion A illustrated in FIG. 6.

Specifically, as illustrated in FIGS. 3 and 4, the slide portion 40 includes a lock portion 42 and a holder portion 41. As illustrated in FIG. 7, the slide portion 40 is accommodated in a slide space 45 formed inside the support portion 24 and is vertically movable. The slide portion 40 is constantly biased downward by a biasing member 43, and is pressed downward inside the slide space 45 in a natural state. However, when an inertial force is generated upward, the slide portion 40 receiving the inertial force linearly moves upward against the biasing force of the biasing member 43.

The lock portion 42 is a member that can abut on the contact portion 25. When an inertial force is generated upward, the lock portion 42 engages with the contact portion 25 to prevent the contact portion 25 from moving. That is, when the lock portion 42 engages with the contact portion 25, the contact portion 25 cannot move in the first direction, and the contact portion 25 is prevented from being in the sign on state. The lock portion 42 according to the present embodiment is a cylindrical roller as illustrated in FIG. 3 and the like. The lock portion 42 is vertically rotatable while being held by the holder portion 41.

The holder portion 41 is a member that supports the lock portion 42. The holder portion 41 can vertically slide along the slide space 45. A recess portion 41*a* that rotatably holds the lock portion 42 is formed in the holder portion 41. The lock portion 42 accommodated in the recess portion 41*a* vertically rotates in conjunction with the vertical movement of the holder portion 41.

As illustrated in FIG. 7, the slide space 45 is provided with a guide portion 45*a* that guides the slide portion 40 in a direction in which the slide portion 40 abuts on the contact portion 25. The guide portion 45*a* has a slope shape inclined with respect to a moving direction of the slide portion 40 (a vertical direction). Specifically, the guide portion 45*a* forms an inclined surface inclined in a manner of approaching the contact portion 25 (an engagement portion 30*b* to be described later) as the slide portion 40 moves upward. Specifically, the guide portion 45*a* protrudes a lateral side of the contact arm 26 (in any direction excluding the moving direction). The holder portion 41 is formed with a groove for avoiding interference with the guide portion 45*a*. Therefore, although the guide portion 45*a* is formed in a manner of protruding inside the slide space 45, the guide portion 45*a* and the holder portion 41 do not interfere with each other. Accordingly, when the slide portion 40 moves upward, only the lock portion 42 is guided diagonally upward by the guide portion 45*a*, and the holder portion 41 moves upward. In this way, as the slide portion 40 moves upward, the lock portion 42 rolls diagonally along the guide portion 45*a* and approaches and abuts on the contact portion 25.

Thus, the lock portion 42 guided by the guide portion 45*a* engages with the contact portion 25. Specifically, by moving along the guide portion 45*a*, the lock portion 42 is guided to the lateral side of the contact arm 26 and abuts on the lateral side of the contact arm 26. In the present embodiment, the lock portion 42 engages with the contact arm 26 (more specifically, engages with the lever pressing portion 30). As illustrated in FIG. 7, the contact arm 26 is formed with the engagement portion 30*b* engageable with the lock portion 42 at a portion where the lock portion 42 abuts on the contact arm 26. The engagement portion 30*b* has a concave shape formed on a surface of the contact arm 26. The engagement portion 30*b* is formed to be shallower than a radius of the lock portion 42, and is tapered such that a thickness thereof is thinner on a center of the engagement portion 30*b* toward the back. As illustrated in FIG. 7 and the like, regarding the engagement portion 30*b*, a side surface (a rising surface) of a groove on a lower side serves as an engagement surface 30*c*. The engagement surface 30*c* is formed substantially parallel to the guide portion 45*a*. The engagement surface 30*c* and the guide portion 45*a* may not necessarily be parallel to each other. The engagement surface 30*c* may be a surface orthogonal to the moving direction of the slide portion 40 (the vertical direction), may be inclined in the same direction as the guide portion 45*a*, or may be inclined in a direction opposite to the guide portion 45*a*. However, when the engagement surface 30*c* and the guide portion 45*a* are substantially parallel to each other, the balance between the smoothness of the engagement and disengagement of the lock portion 42 and the slide resistance of the contact arm 26 during normal operation in which the inertial force is not acting is good. When moving upward, the lock portion 42 is fitted into the engagement portion 30*b* to lock the movement of the contact arm 26. In other words, the lock portion 42 is sandwiched between the guide portion 45*a* and the engagement surface 30*c* to lock the movement of the contact arm 26.

Figure 6:
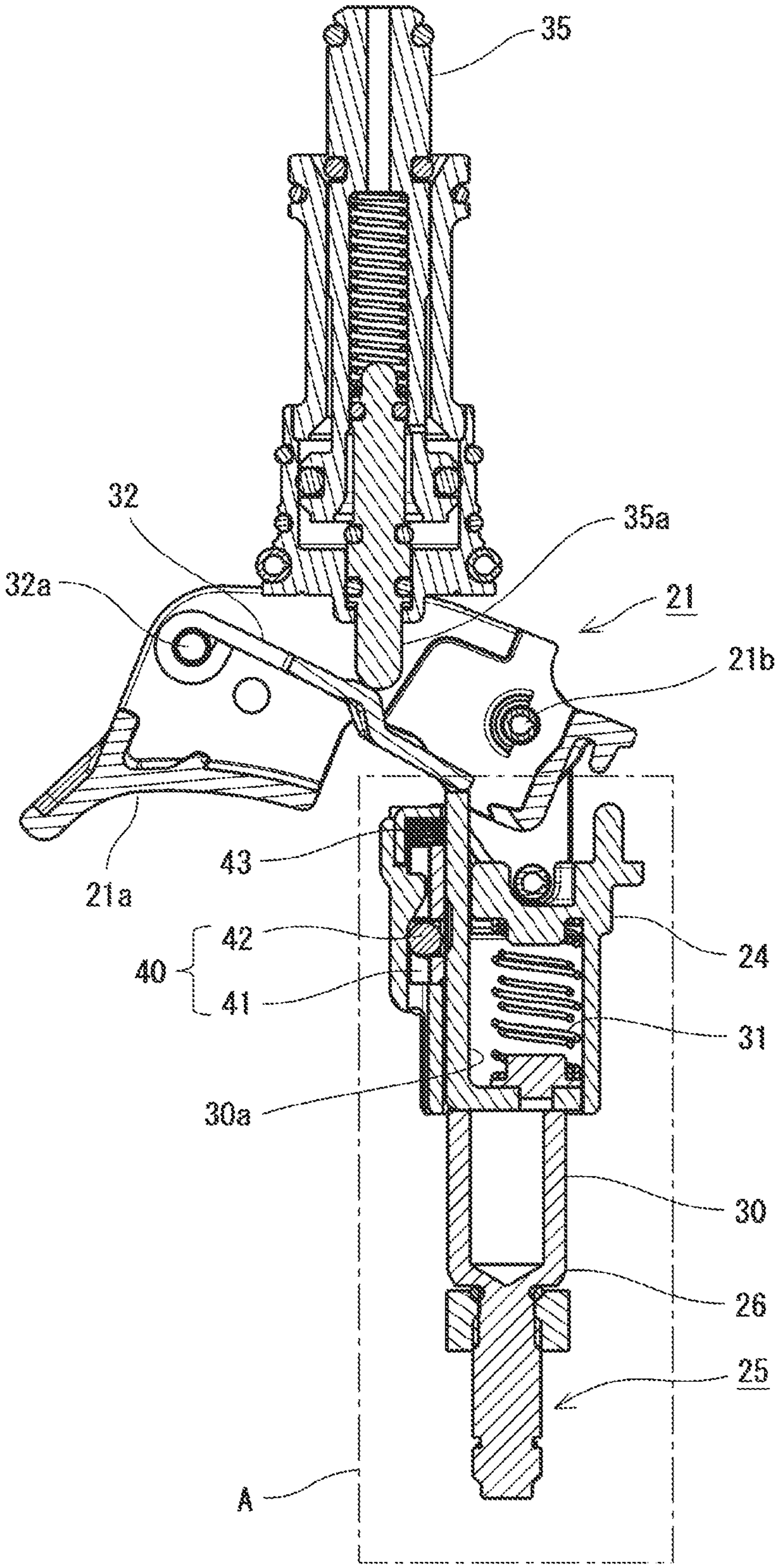
FIG. 6 is a cross-sectional view of the vicinity of the trigger lever in a state in which the trigger lever is operated.

Next, an action of the slide portion 40 described above will be described. That is, a description will be given of how to implement the non-driving state when an inertial force is generated upward. Here, as illustrated in FIGS. 6 and 7, a state in which the trigger lever 21 is pulled will be described as an example. In a state in which the trigger lever 21 is pulled in this way, if the contact arm 26 moves upward to be in the sign on state, the valve stem 35*a* is pushed in by the contact lever 32, and the driving portion 13 operates. Therefore, it is dangerous when the contact arm 26 unintentionally operates.

Figure 8:
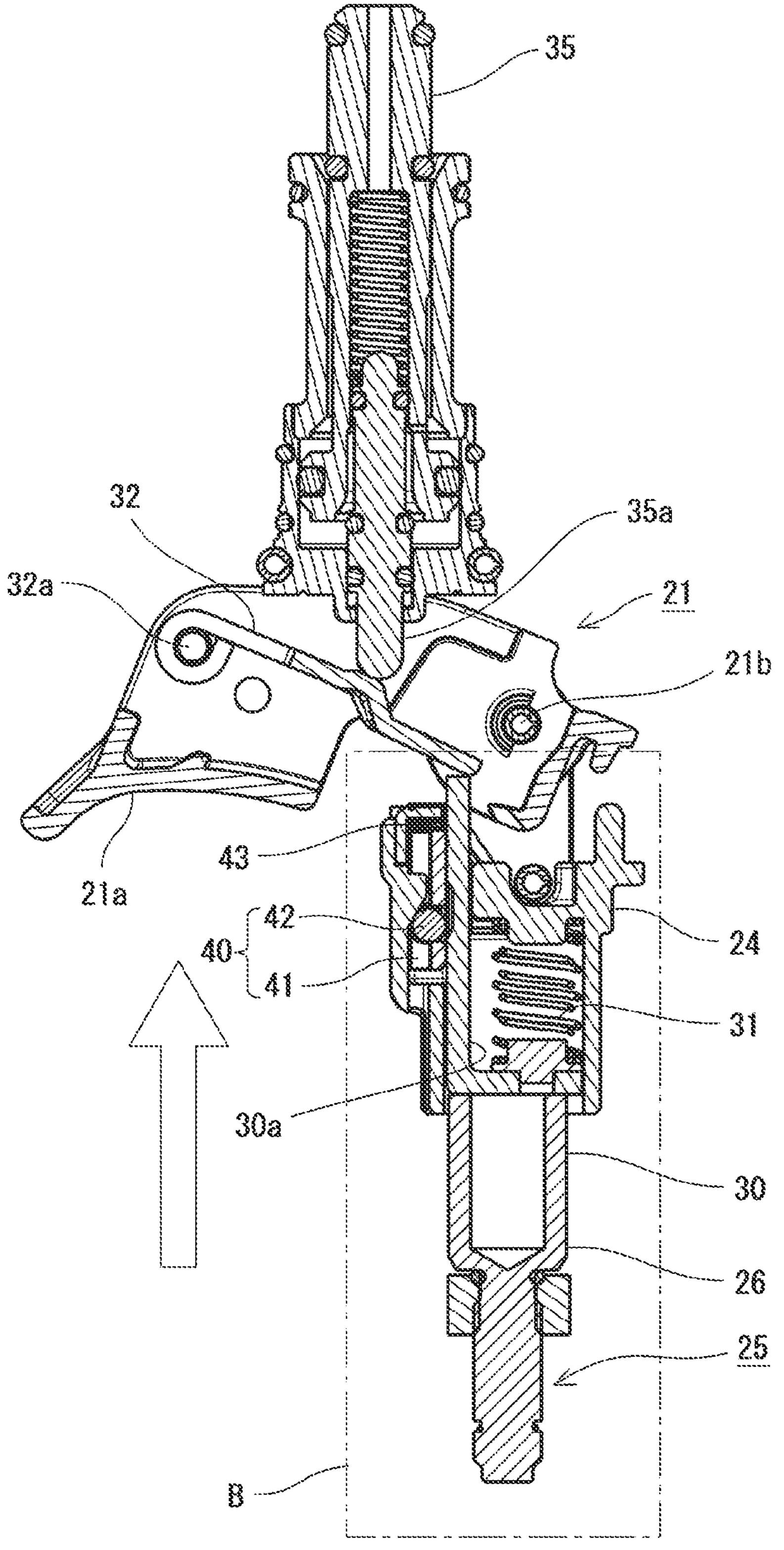
FIG. 8 is a cross-sectional view of the vicinity of the trigger lever obtained when an inertial force starts to occur in a first direction.
Figure 9:
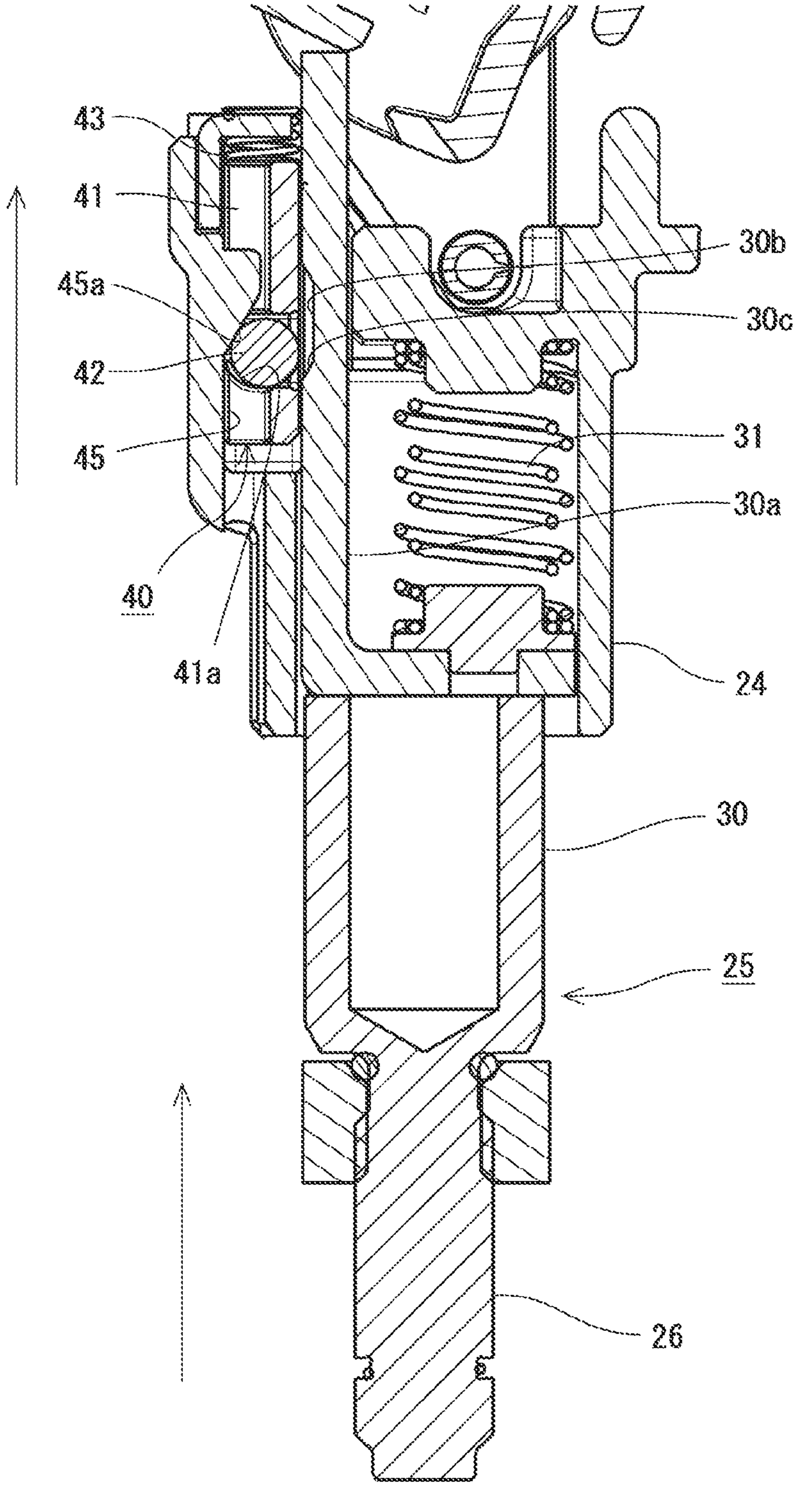
FIG. 9 is an enlarged view of a portion B illustrated in FIG. 8.

In this state, when an inertial force that causes the contact arm 26 to move upward (in an arrow direction) is generated as illustrated in FIGS. 8 and 9, an inertial force that causes the slide portion 40 to move upward (in the arrow direction) is simultaneously generated.

Figure 10:
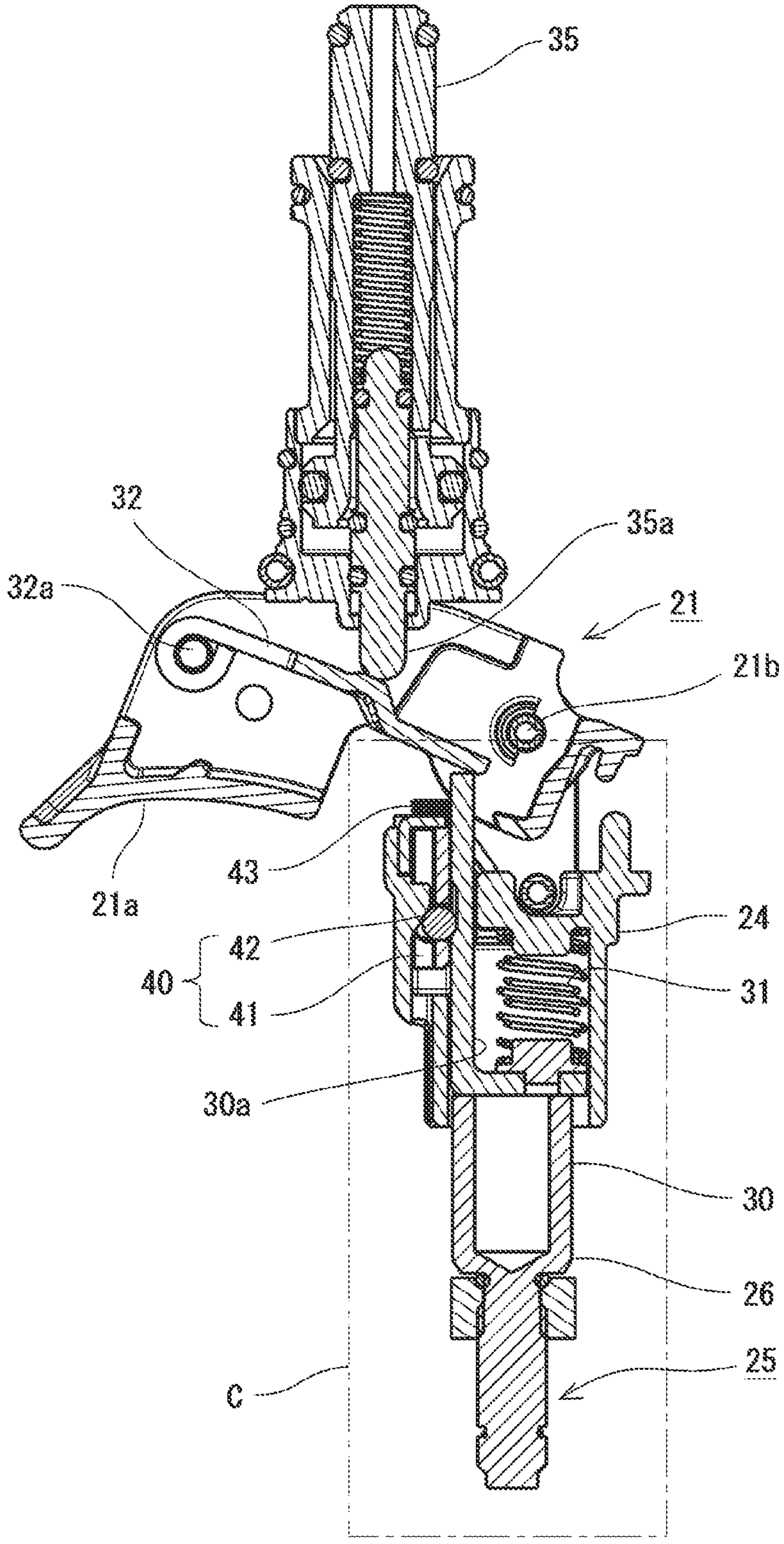
FIG. 10 is a cross-sectional view of the vicinity of the trigger lever obtained when a movable portion engages with a contact portion.
Figure 11:
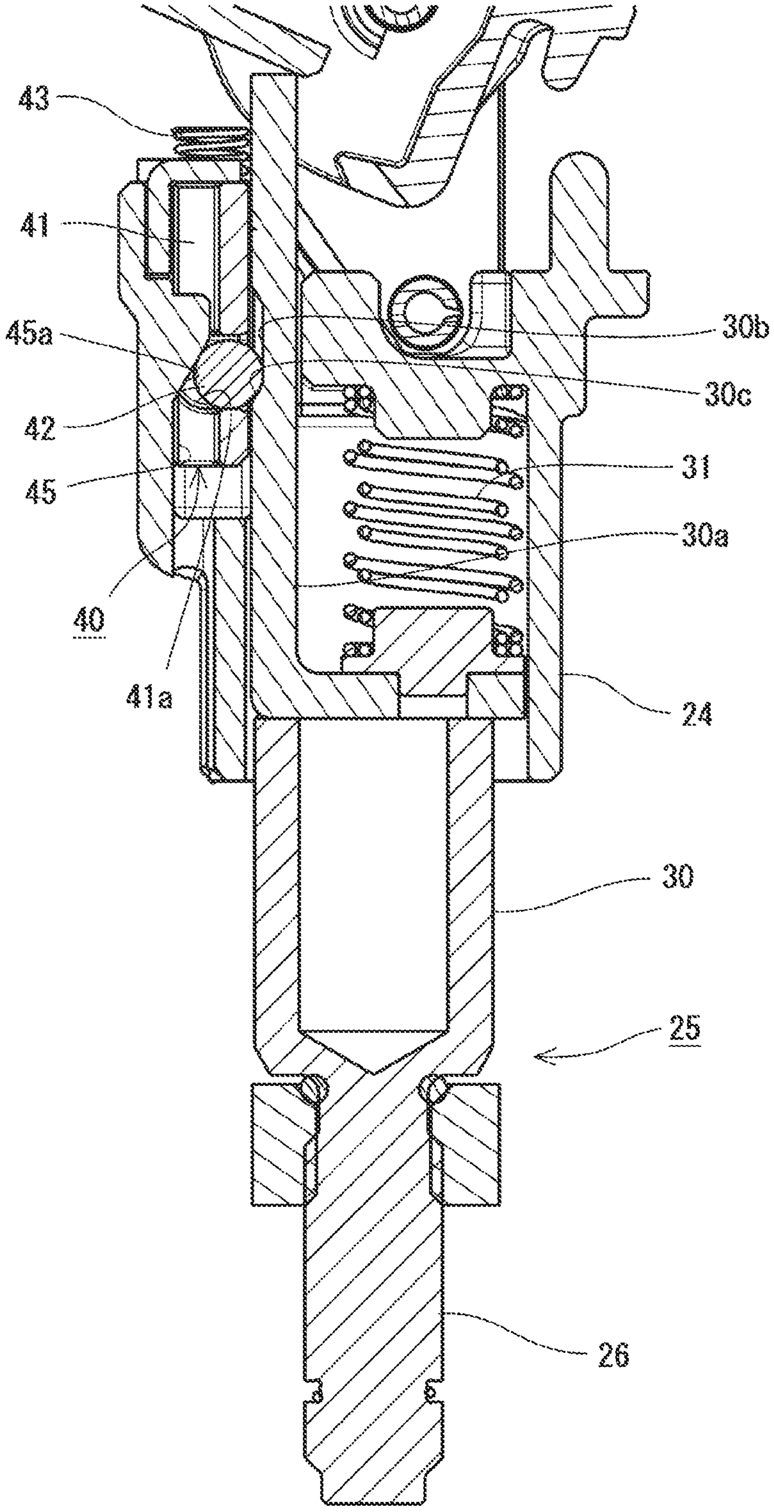
FIG. 11 is an enlarged view of a portion C illustrated in FIG. 10.

When such an inertial force is generated, as illustrated in FIGS. 10 and 11, the slide portion 40 moves upward to a position where the lock portion 42 runs onto the guide portion 45*a*. Accordingly, the lock portion 42 is pushed out to a movement path of the contact arm 26, and the lock portion 42 is fitted into the engagement portion 30*b* of the contact arm 26. Thus, the lock portion 42 is sandwiched between the guide portion 45*a* (a diagonally downward surface) and the engagement surface 30*c* (a diagonally upward surface) of the engagement portion 30*b*, and the contact arm 26 is locked so as not to move upward. In other words, the contact arm 26 is restricted from moving by a predetermined amount to be in the sign on state. In this way, even when an inertial force that causes the contact arm 26 to move upward is generated, the contact arm 26 is not brought into the sign on state. That is, when an inertial force that causes the contact arm 26 to move upward is generated, the driving portion 13 is brought into the non-driving state in which the driving portion 13 does not operate.

Thereafter, if the inertial force that causes the contact arm 26 to move upward (in the arrow direction) is gone, the contact arm 26 returns in the protruding direction, and the lock portion 42 is released from being sandwiched. The slide portion 40 is also biased by the biasing member 43 and moves downward. This returns to the state illustrated in FIGS. 6 and 7.

Even if the contact arm 26 is not provided with the engagement portion 30*b*, the contact arm 26 can be locked by friction between the lock portion 42 and the contact arm 26. However, even in a case in which the inertial force that causes the contact arm 26 to move upward (in the arrow direction) is gone, there is a possibility that the slide portion 40 does not automatically return, and thus it is desirable to provide the engagement portion 30*b*.

As described above, the present embodiment includes the slide portion 40 that starts moving independently of the contact portion 25 when an inertial force is generated upward (in the first direction), and by the slide portion 40 moving when an inertial force is generated upward, the driving portion 13 is brought into the non-driving state in which the driving portion 13 does not operate. That is, the slide portion 40 is used to implement a restricting portion that restricts the driving operation performed by the driving portion 13 when an inertial force is generated in the first direction. Therefore, even when an inertial force that causes the contact arm 26 to move in the operation direction is generated, the safety of the driving tool 10 can be ensured. Since it is unnecessary to increase a spring load of the contact arm 26 or to slow down the reaction of the main valve portion 16, there is no bad influence on the operability of the user.

Specifically, the slide portion 40 engages with the contact portion 25 when an inertial force is generated upward, and prevents the contact portion 25 from being in the sign on state, and thus the driving portion 13 can be prevented from activating when an inertial force is generated upward.

First Modification

A feature of the present modification is that a rotation restricting member 50 (a movable portion) as illustrated in FIGS. 12 and 13A to 13D is used instead of the slide portion 40 according to the embodiment described above. Since a basic configuration of the present modification is not different from that of the embodiment described above, only different points will be described while avoiding redundant description.

The rotation restricting member 50 is a member rotatably attached to the body housing 12. The rotation restricting member 50 starts moving independently of the contact portion 25 when an inertial force is generated in the first direction. By the rotation restricting member 50 moving when an inertial force is generated upward, the driving portion 13 is brought into the non-driving state in which the driving portion 13 does not operate. Specifically, the rotation restricting member 50 engages with the contact portion 25 when an inertial force is generated upward (in the first direction), and prevents the contact portion 25 from being in the sign on state.

As illustrated in FIGS. 13A to 13D, the rotation restricting member 50 includes shaft holes 50*a*, weight portions 50*b*, and engagement claw portions 50*c*.

Figure 12:
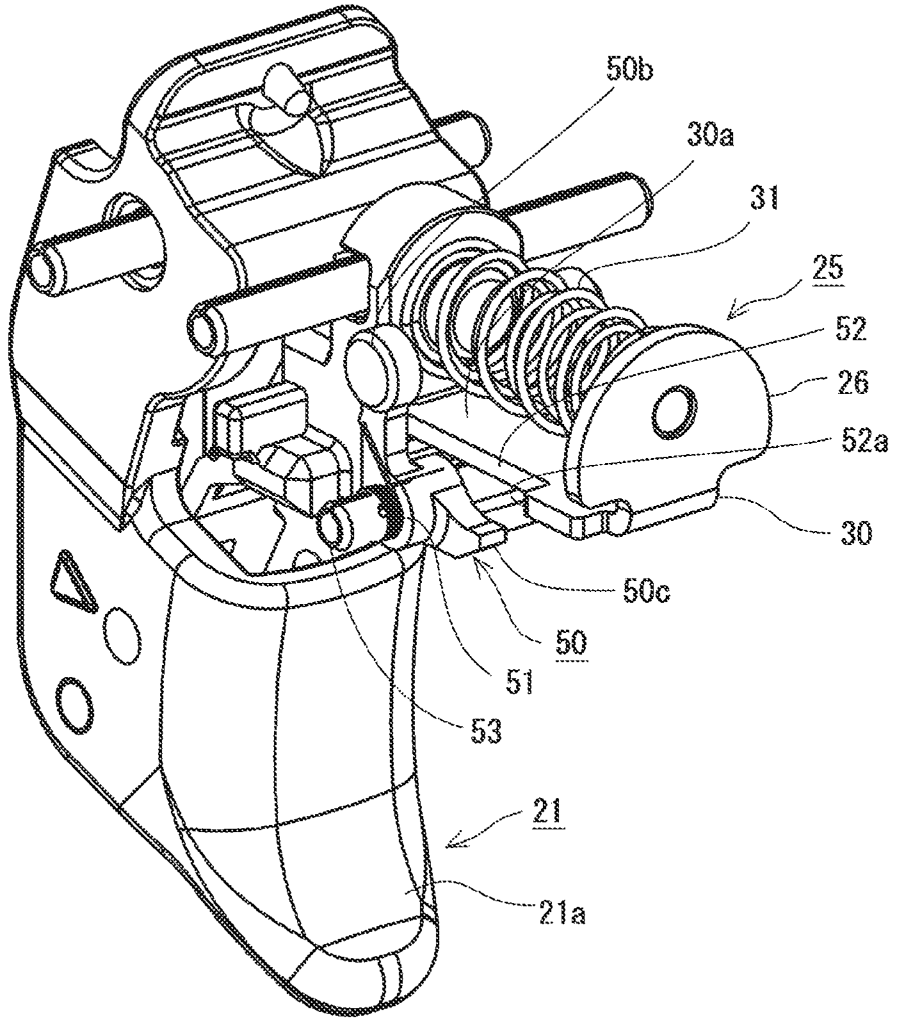
FIG. 12 is diagram illustrating a first modification, which is a perspective view of a vicinity of a trigger lever.
Figure 13A:
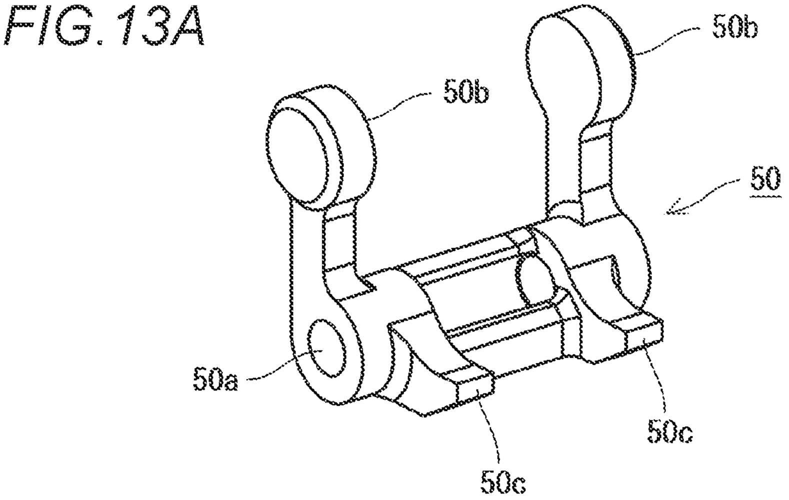
Figure 13B:
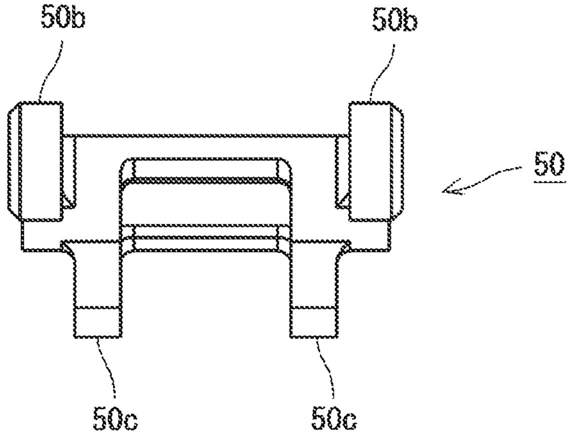
Figure 13C:
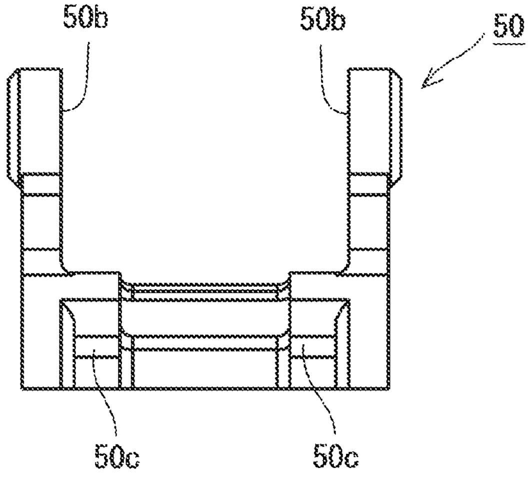
Figure 13D:
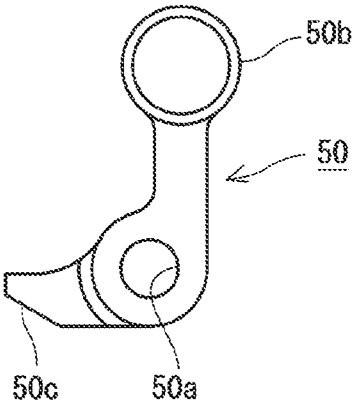

The shaft hole 50*a* is a hole through which a rotation shaft 53 is inserted. As illustrated in FIG. 12, the rotation restricting member 50 is rotatable in the vicinity of the trigger lever 21 with the rotation shaft 53 as a shaft. The rotation shaft 53 of the rotation restricting member 50 is orthogonal to the first direction and is disposed parallel to the trigger rotation shaft 21*b*.

The weight portion 50*b* is a weight for the rotation restricting member 50 to be easily affected by an inertial force. The engagement claw portion 50*c* is a portion engageable with the contact portion 25. The engagement claw portion 50*c* is a protruding portion that can protrude into a movement path of the contact portion 25 by rotation. The engagement claw portion 50*c* is retracted from the movement path of the contact portion 25 upward (in the first direction) when waiting. On the other hand, when the rotation restricting member 50 rotates, the engagement claw portion 50*c* protrudes into the movement path of the contact portion 25 and engages with the contact portion 25.

The weight portion 50*b* and the engagement claw portion 50*c* protrude in different directions with the shaft hole 50*a* sandwiched therebetween. That is, the weight portion 50*b* is positioned on one end side of the rotation restricting member 50, and the engagement claw portion 50*c* is positioned on the other end side of the rotation restricting member 50. In the present modification, the weight portion 50*b* and the engagement claw portion 50*c* protrude in directions substantially orthogonal to each other, and the weight portion 50*b* and the engagement claw portion 50*c* form a substantially L-shape in a side view. The weight portion 50*b* and the engagement claw portion 50*c* may be freely disposed as long as an action of the rotation restricting member 50 can be implemented. For example, the weight portion 50*b* and the engagement claw portion 50*c* may be provided in the same direction as viewed from the shaft hole 50*a*.

The rotation restricting member 50 is constantly biased by a biasing member 51. The biasing member 51 is a torsion coil spring attached to the rotation shaft 53. The rotation restricting member 50 is biased by the biasing member 51 in a manner of not engaging with the contact portion 25 in a natural state. Specifically, the rotation restricting member 50 is biased by the biasing member 51 to make the engagement claw portion 50*c* to wait at a position retracted from the movement path of the contact portion 25. However, when an inertial force is generated upward, the rotation restricting member 50 rotates against the biasing force of the biasing member 51 and engages with the contact portion 25.

In the present modification, the engagement claw portion 50*c* is engageable with the contact arm 26 (more specifically, is engageable with the lever pressing portion 30). As illustrated in FIG. 12, an engaged portion 52*a* to which the engagement claw portion 50*c* is engageable is formed in the contact arm 26. The engaged portion 52*a* is formed by providing a notch portion 52 in a side portion of the pressing piece 30*a*. When the rotation restricting member 50 moves (rotates), the engagement claw portion 50*c* enters the inside of the notch portion 52. Specifically, by protruding upper relative to the engaged portion 52*a*, the engagement claw portion 50*c* protrudes into the movement path of the contact portion 25. In this state, even when the contact arm 26 moves upward, the engagement claw portion 50*c* and the engaged portion 52*a* interfere with each other, and the upward movement of the contact arm 26 is prevented.

Figure 14:
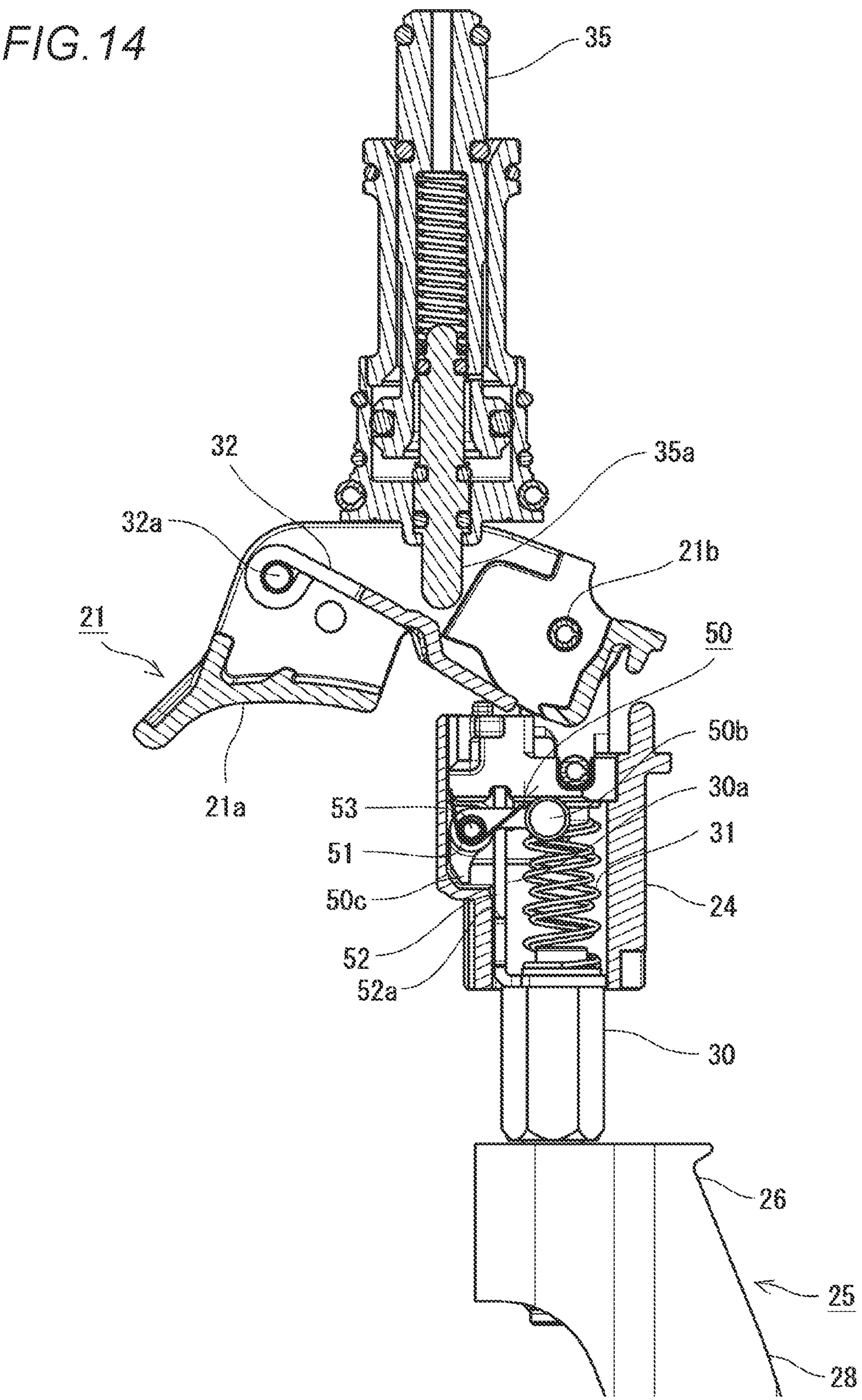
FIG. 14 is diagram illustrating the first modification, which is a cross-sectional view of the vicinity of the trigger lever in a state in which the trigger lever is operated.

Next, an action of the rotation restricting member 50 described above will be described. That is, a description will be given of how to implement the non-driving state when an inertial force is generated upward. Here, as illustrated in FIG. 14, a state in which the trigger lever 21 is pulled will be described as an example. In a state in which the trigger lever 21 is pulled in this way, if the contact arm 26 moves upward to be in the sign on state, the valve stem 35*a* is pushed in by the contact lever 32. Therefore, it is dangerous when the contact arm 26 unintentionally operates.

Figure 15:
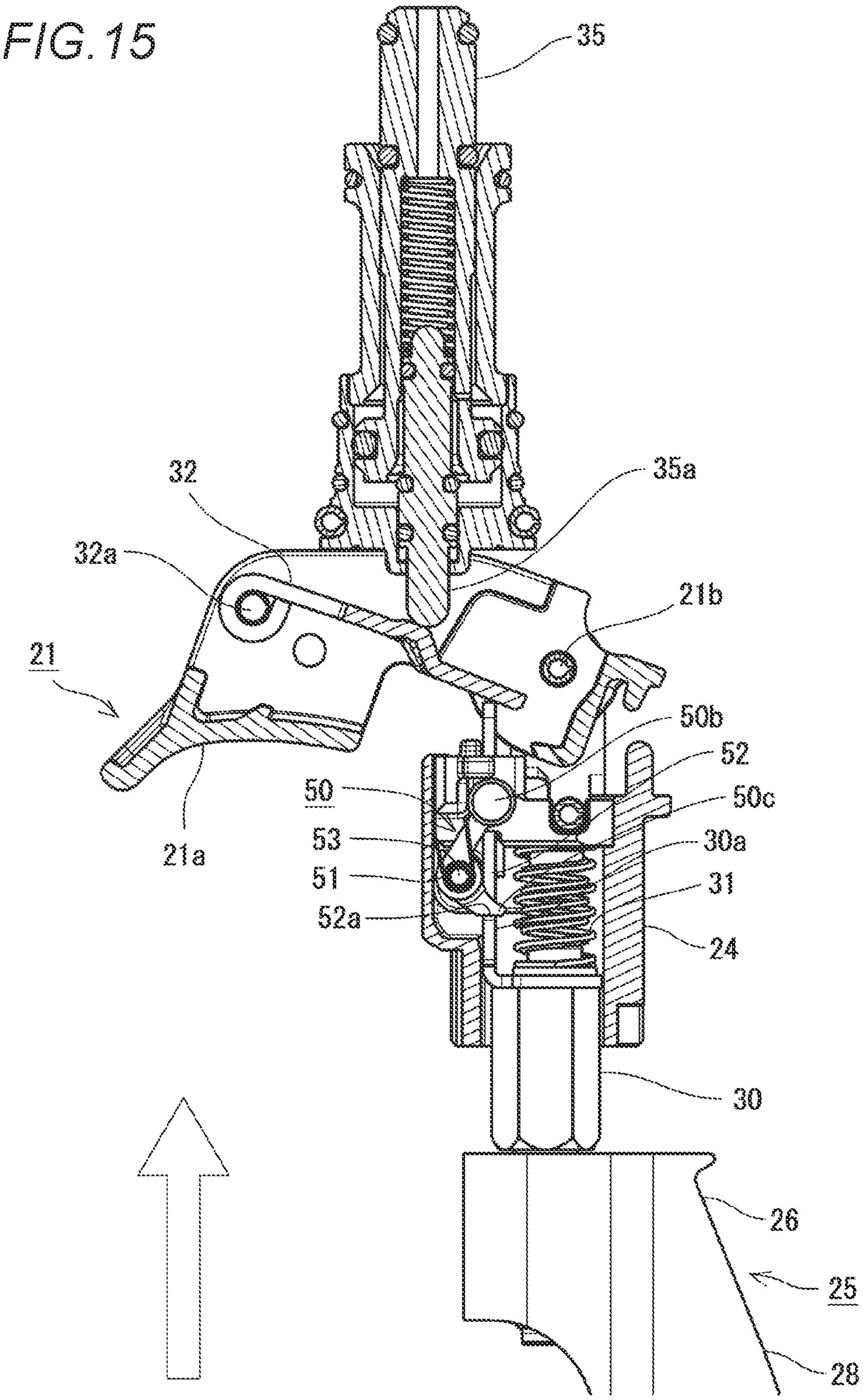
FIG. 15 is a diagram illustrating the first modification, which is a cross-sectional view of the vicinity of the trigger lever when a movable portion engages with a contact portion.
Figure 16A:
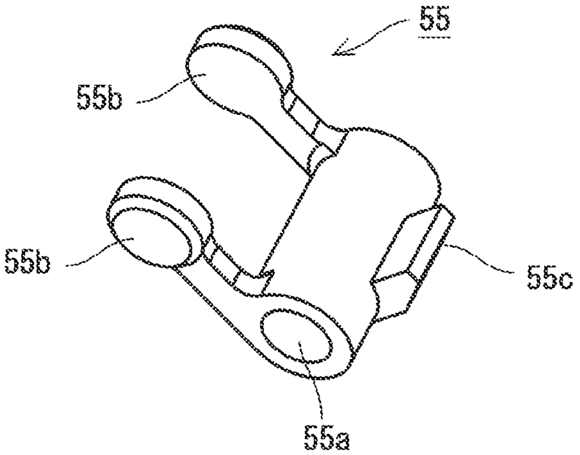
Figure 16B:
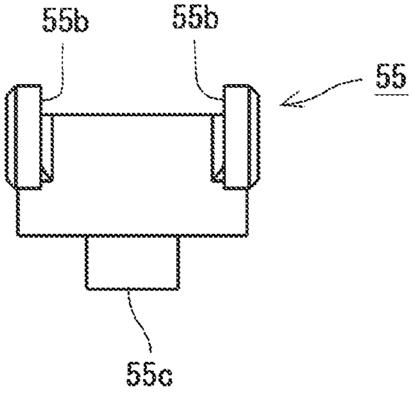
Figure 16C:
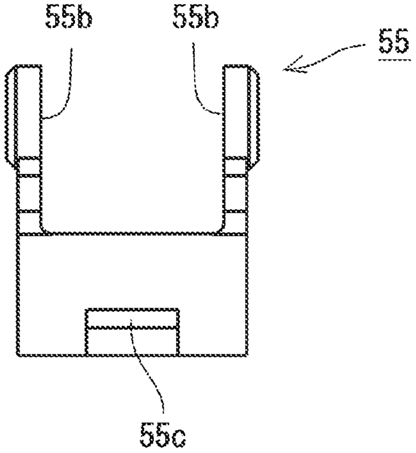
Figure 16D:
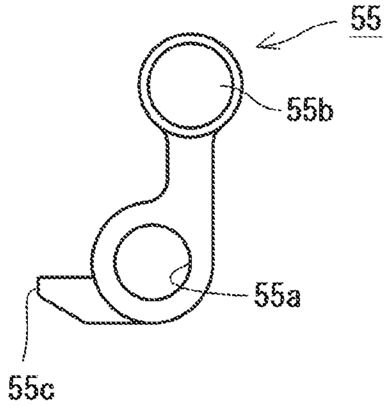

In a state in which no inertial force is generated, the engagement claw portion 50*c* does not protrude into the movement path of the contact portion 25. For this reason, the contact arm 26 can move upward by a predetermined amount with which the contact arm 26 is in the sign on state. In this state, when an inertial force that causes the contact arm 26 to move upward (in an arrow direction) is generated as illustrated in FIG. 15, an inertial force that causes the rotation restricting member 50 to rotate is simultaneously generated. Specifically, an inertial force that causes the weight portion 50*b* to move upward (in the first direction) is generated, and the rotation restricting member 50 rotates due to this inertial force. In other words, with a shaft portion positioned between the weight portion 50*b* and the engagement claw portion 50*c* (an abutting portion) and orthogonal to the first direction as a fulcrum, the weight portion 50*b* rotates in the first direction and the engagement claw portion 50*c* (the abutting portion) rotates in a direction approaching the contact arm 26. When the rotation restricting member 50 rotates, the engagement claw portion 50*c* protrudes into the movement path of the contact arm 26. In other words, the engagement claw portion 50*c* can abut on the contact arm 26 by rotating in a direction approaching the contact arm 26. Accordingly, even if the contact arm 26 moves upward, the engaged portion 52*a* is caught by the engagement claw portion 50*c*, and the contact arm 26 is locked so as not to move upper than the engagement claw portion 50*c*. In other words, the contact arm 26 is prevented from moving by a predetermined amount to be in the sign on state. In this way, even if an inertial force that causes the contact arm 26 to move upward is generated, the contact arm 26 is not in the sign on state. That is, when an inertial force that causes the contact arm 26 to move upward is generated, the driving portion 13 is brought into the non-driving state in which the driving portion 13 does not operate.

As described above, the present embodiment includes the rotation restricting member 50 (a restricting portion) that starts moving independently of the contact portion 25 when an inertial force is generated upward (in the first direction), and by the rotation restricting member 50 rotating when an inertial force is generated upward, the driving portion 13 is brought into the non-driving state in which the driving portion 13 does not operate. That is, the rotation restricting member 50 is used to implement the restricting portion that restricts the driving operation performed by the driving portion 13 when an inertial force is generated in the first direction. Therefore, even when an inertial force that causes the contact arm 26 to move in the operation direction is generated, the safety of the driving tool 10 can be ensured. Since it is unnecessary to increase a spring load of the contact arm 26 or to slow down the reaction of the main valve portion 16, there is no bad influence on the operability of the user.

Specifically, the rotation restricting member 50 engages with the contact portion 25 when an inertial force is generated upward, and prevents the contact portion 25 from being in the sign on state, and thus the driving portion 13 can be prevented from activating when an inertial force is generated upward.

Second Modification

A feature of the present modification is that a rotation restricting member 55 (a movable portion) as illustrated in FIGS. 16A to 16D is used instead of the slide portion 40 according to the embodiment described above. Since a basic configuration of the present modification is not different from that of the embodiment described above, only different points will be described while avoiding redundant description.

The rotation restricting member 55 is a member rotatably attached to the trigger lever 21. The rotation restricting member 55 starts moving independently of the contact portion 25 when an inertial force is generated in the first direction. By the rotation restricting member 55 moving when an inertial force is generated upward, the driving portion 13 is brought into the non-driving state in which the driving portion 13 does not operate. Specifically, the rotation restricting member 55 is a member that engages with the contact portion 25 when an inertial force is generated upward (in the first direction), and prevents the contact portion 25 from being in the sign on state.

As illustrated in FIGS. 16A to 16D, the rotation restricting member 55 includes shaft holes 55*a*, weight portions 55*b*, and engagement claw portions 55*c*.

Figure 17:
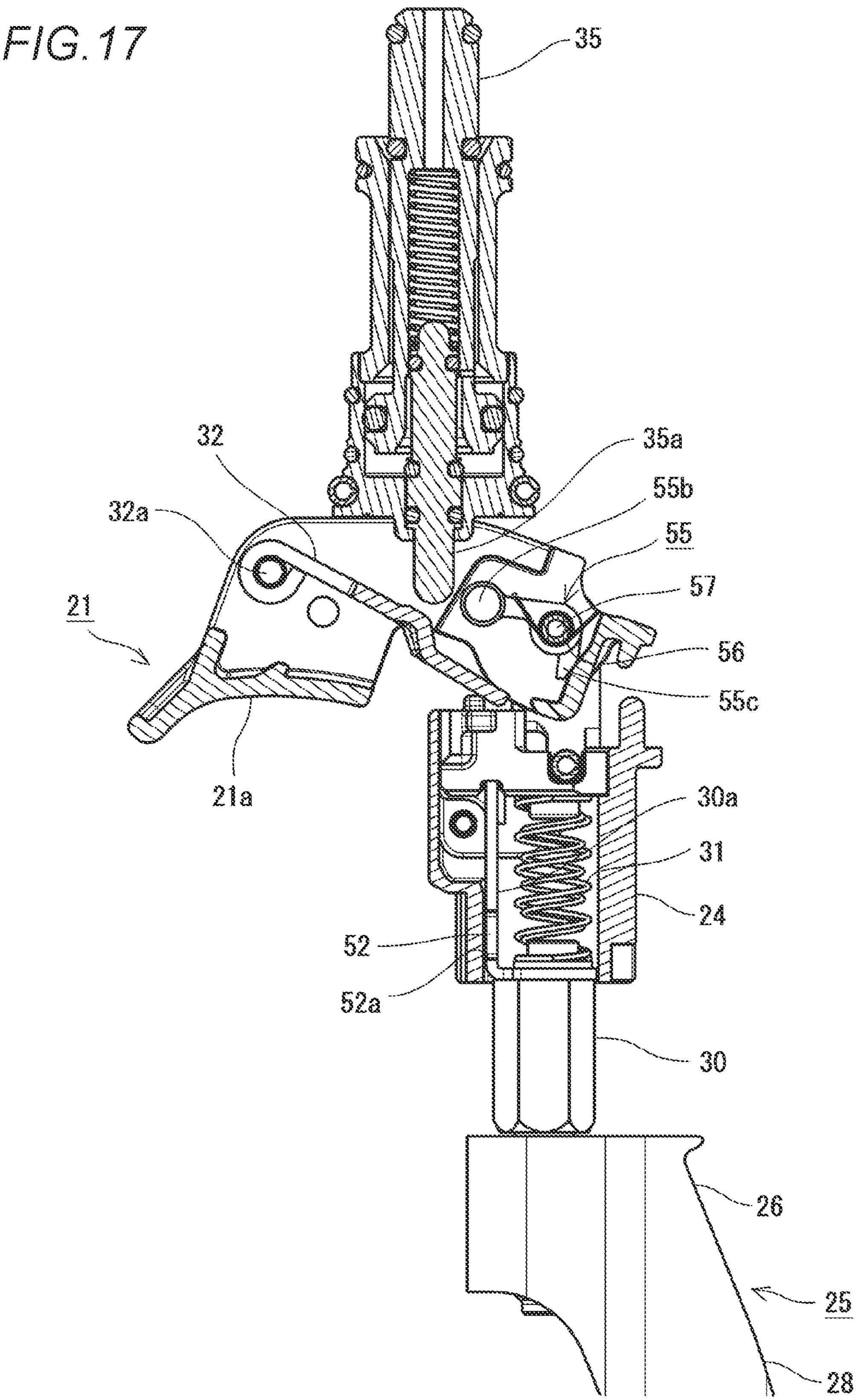
FIG. 17 is a diagram illustrating the second modification, which is a cross-sectional view of the vicinity of the trigger lever in a state in which the trigger lever is operated.
Figure 18:
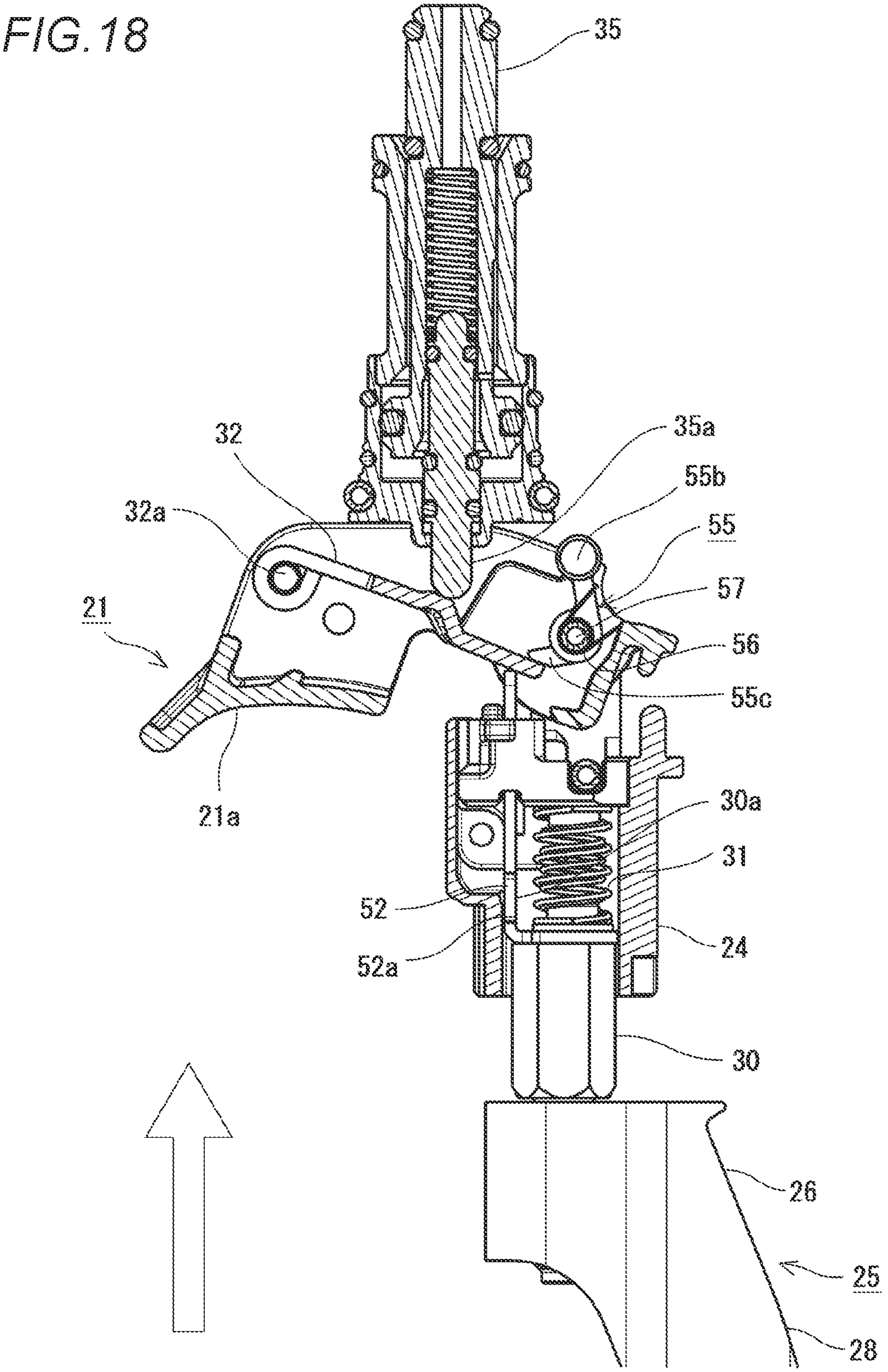
FIG. 18 is a diagram illustrating the second modification, which is a cross-sectional view of the vicinity of the trigger lever when a movable portion engages with a contact portion.

The shaft hole 55*a* is a hole through which a rotation shaft 57 is inserted. As illustrated in FIGS. 17 and 18, the rotation restricting member 55 is rotatable inside the trigger lever 21 with the rotation shaft 57 as a shaft. The rotation shaft 57 of the rotation restricting member 55 is disposed in parallel with the trigger rotation shaft 21*b*.

The weight portion 55*b* is a weight for the rotation restricting member 55 to be easily affected by an inertial force. The engagement claw portion 55*c* is a portion engageable with the contact portion 25. The engagement claw portion 55*c* is a protruding portion that can protrude into the movement path of the contact portion 25 by rotation. The engagement claw portion 55*c* is retracted from the movement path of the contact portion 25 upward (in the first direction) when waiting. On the other hand, when the rotation restricting member 55 rotates, the engagement claw portion 55*c* protrudes into the movement path of the contact portion 25 and engages with the contact portion 25.

The weight portion 55*b* and the engagement claw portion 55*c* protrude in different directions with the shaft hole 55*a* sandwiched therebetween. In the present modification, the weight portion 55*b* and the engagement claw portion 55*c* protrude in directions substantially orthogonal to each other, and the weight portion 55*b* and the engagement claw portion 55*c* form a substantially L-shape in a side view. The weight portion 55*b* and the engagement claw portion 55*c* may be freely disposed as long as an action of the rotation restricting member 55 can be implemented. For example, the weight portion 55*b* and the engagement claw portion 55*c* may be provided in the same direction as viewed from the shaft hole 55*a*.

The rotation restricting member 55 is constantly biased by a biasing member 56. The biasing member 56 is a torsion coil spring attached to the rotation shaft 57. The rotation restricting member 55 is biased by the biasing member 56 in a manner of not engaging with the contact portion 25 in a natural state. Specifically, the rotation restricting member 55 is biased by the biasing member 56 to make the engagement claw portion 55*c* to wait at a position retracted from the movement path of the contact portion 25. However, when an inertial force is generated upward, the rotation restricting member 55 rotates against the biasing force of the biasing member 56 and engages with the contact portion 25.

In the present modification, the engagement claw portion 55*c* is engageable with the contact lever 32. When the rotation restricting member 55 moves (rotates), the engagement claw portion 55*c* engages with a tip end of the contact lever 32 to prevent the movement of the contact lever 32.

Next, an action of the rotation restricting member 55 described above will be described. That is, a description will be given of how to implement the non-driving state when an inertial force is generated upward. Here, as illustrated in FIG. 17, a state in which the trigger lever 21 is pulled will be described as an example. In a state in which the trigger lever 21 is pulled in this way, if the contact arm 26 moves upward to be in the sign on state, the valve stem 35*a* is pushed in by the contact lever 32. Therefore, it is dangerous when the contact arm 26 unintentionally operates.

In a state in which no inertial force is generated, the engagement claw portion 55*c* does not protrude into the movement path of the contact portion 25. For this reason, the contact arm 26 can move upward by a predetermined amount with which the contact arm 26 is in the sign on state. In this state, when an inertial force that causes the contact arm 26 to move upward (in an arrow direction) is generated as illustrated in FIG. 17, an inertial force that causes the rotation restricting member 55 to rotate is simultaneously generated. Specifically, an inertial force that causes the weight portion 55*b* to move upward (in the first direction) is generated, and the rotation restricting member 55 rotates due to this inertial force. In other words, with a shaft portion positioned between the weight portion 55*b* and the engagement claw portion 55*c* (an abutting portion) and orthogonal to the first direction as a fulcrum, the weight portion 55*b* rotates in the first direction and the engagement claw portion 55*c* (the abutting portion) rotates in a direction approaching the contact arm 26. When the rotation restricting member 55 rotates, the engagement claw portion 55*c* protrudes into the movement path of the contact lever 32. Thus, since the contact lever 32 cannot move upward, the contact arm 26 is locked so as not to move upper than the engagement claw portion 55*c*. In other words, by rotating in the direction approaching the contact arm 26, the engagement claw portion 55*c* (the abutting portion) can abut on the contact arm 26 from above via the contact lever 32, and thus the contact arm 26 is prevented from moving by a predetermined amount to be in the sign on state. For this reason, even if an inertial force that causes the contact arm 26 to move upward is generated, the contact arm 26 is not in the sign on state. That is, when an inertial force that causes the contact arm 26 to move upward is generated, the driving portion 13 is brought into the non-driving state in which the driving portion 13 does not operate.

As described above, the present embodiment includes the rotation restricting member 55 that starts moving independently of the contact portion 25 when an inertial force is generated upward (in the first direction), and when the rotation restricting member 55 rotates when an inertial force is generated upward, the driving portion 13 is brought into the non-driving state in which the driving portion 13 does not operate. That is, the rotation restricting member 55 is used to implement a restricting portion that restricts the driving operation performed by the driving portion 13 when an inertial force is generated in the first direction. The restricting portion can abut on the contact arm 26 from above when an inertial force is generated in the first direction. Specifically, the restricting portion can abut on the contact arm 26 from above via the contact lever 32 when an inertial force is generated in the first direction. Therefore, even when an inertial force that causes the contact arm 26 to move in the operation direction is generated, the safety of the driving tool 10 can be ensured. Since it is unnecessary to increase a spring load of the contact arm 26 or to slow down the reaction of the main valve portion 16, there is no bad influence on the operability of the user.

Specifically, the rotation restricting member 55 engages with the contact portion 25 when an inertial force is generated upward, and prevents the contact portion 25 from being in the sign on state, and thus the driving portion 13 can be prevented from activating when an inertial force is generated upward.

Third Modification

A feature of the present modification is that a lock valve portion 60 for opening and closing the air flow path 19 is used instead of the slide portion 40 according to the embodiment described above. Since a basic configuration of the present modification is not different from that of the embodiment described above, only different points will be described while avoiding redundant description.

Figure 19:
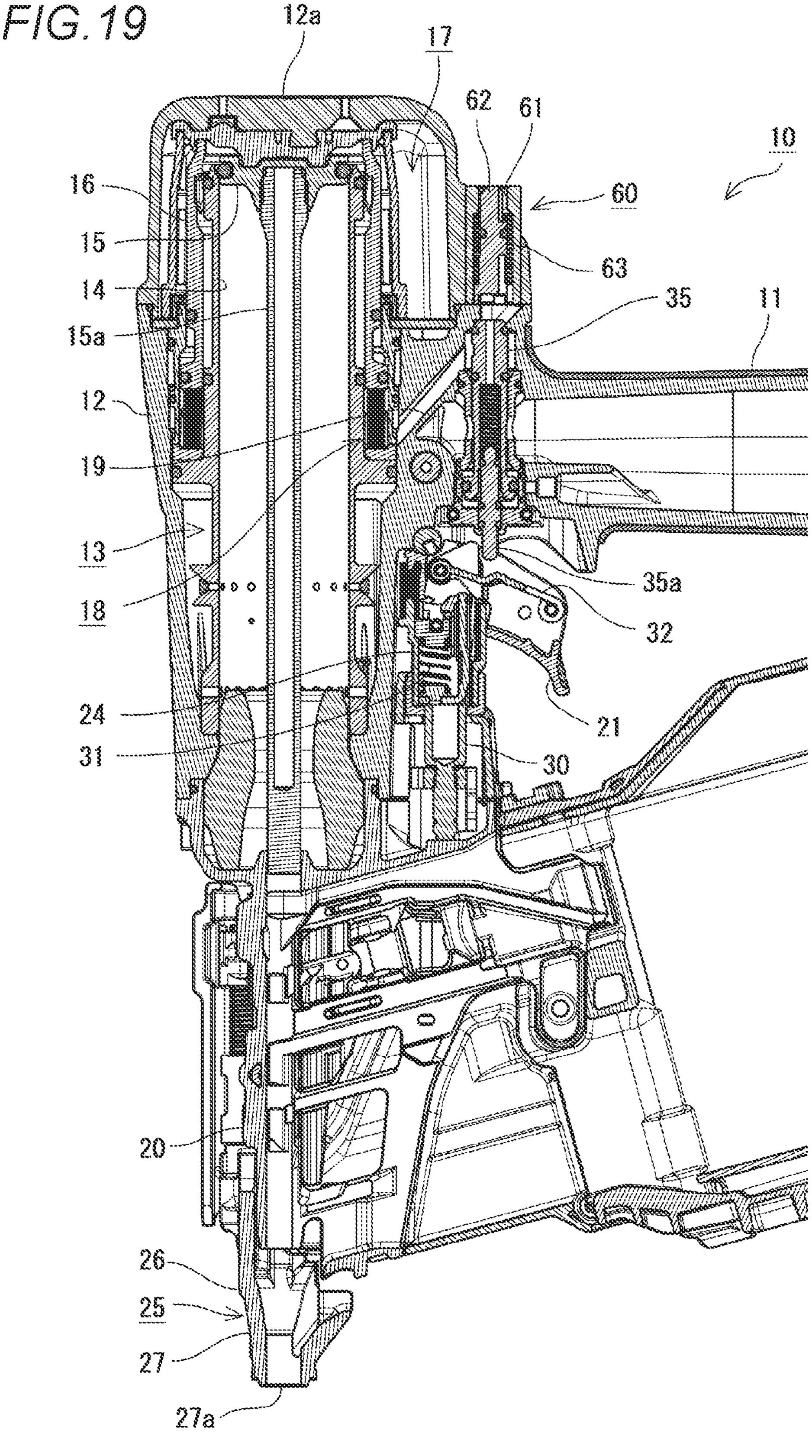
FIG. 19 is a partially enlarged view of a driving tool used for describing a third modification, which is a diagram in a sign off state.
Figure 23A:
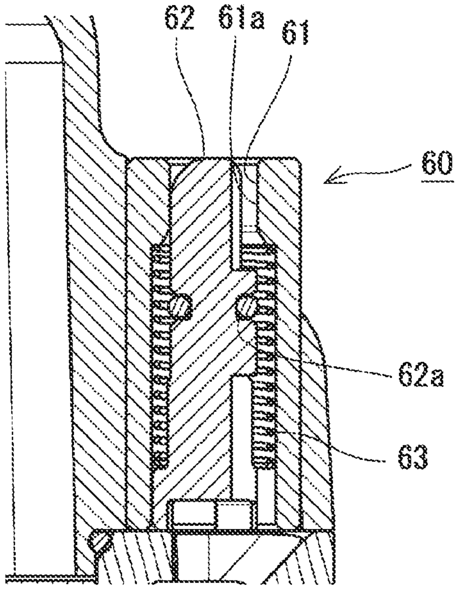
Figure 23B:
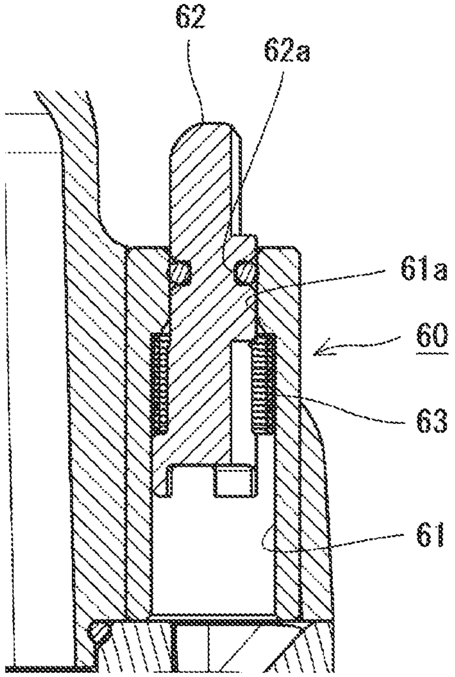

As illustrated in FIG. 19, the lock valve portion 60 is disposed in the vicinity of an outlet of the air flow path 19, and is a portion for opening and closing the air flow path 19 at a position different from the pilot valve 35. As illustrated in FIGS. 23A and 23B, the lock valve portion 60 includes an exhaust passage 61, a valve stem 62, and a biasing member 63.

The exhaust passage 61 constitutes the outlet of the air flow path 19. When the exhaust passage 61 is closed, the air flow path 19 is closed, and compressed air in the air chamber 18 does not escape to the outside. The exhaust passage 61 includes a reduced diameter portion 61*a* formed to have a diameter smaller than that of an upstream side.

The valve stem 62 is a member disposed inside the exhaust passage 61 to be movable vertically in order to open and close the exhaust passage 61. The valve stem 62 constitutes a movable portion that starts moving independently of the contact portion 25 when an inertial force is generated in the first direction (upward). The valve stem 62 is positioned below in a natural state to open the exhaust passage 61. The valve stem 62 closes the exhaust passage 61 by moving upward by a predetermined amount. Specifically, the valve stem 62 includes a seal portion 62*a* formed from an O-ring or the like. When the valve stem 62 is positioned below, as illustrated in FIG. 23A, the seal portion 62*a* is positioned below the reduced diameter portion 61*a*, and the exhaust passage 61 is not closed. On the other hand, when the valve stem 62 is positioned above as illustrated in FIG. 23B, the seal portion 62*a* enters the inside of the reduced diameter portion 61*a*, and the exhaust passage 61 is closed.

The biasing member 63 is a member (such as a spring) that biases the valve stem 62 downward. When the valve stem 62 is biased by the biasing member 63, the lock valve portion 60 opens the air flow path 19 in a waiting state in which an inertial force is not generated upward.

The valve stem 62 moves upward against a biasing force of the biasing member 63 when an inertial force is generated upward. When the valve stem 62 moves upward, the driving portion 13 is brought into the non-driving state in which the driving portion 13 does not operate. Specifically, when the valve stem 62 moves upward by a predetermined amount, the seal portion 62*a* blocks the exhaust passage 61. In this way, the air flow path 19 is closed by the lock valve portion 60, and even if the pilot valve 35 temporarily operates, the compressed air in the air chamber 18 does not escape, and the main valve portion 16 does not operate.

Next, an action of the valve stem 62 described above will be described. First, a driving operation when an inertial force is not generated (in a normal state) will be described.

Figure 20:
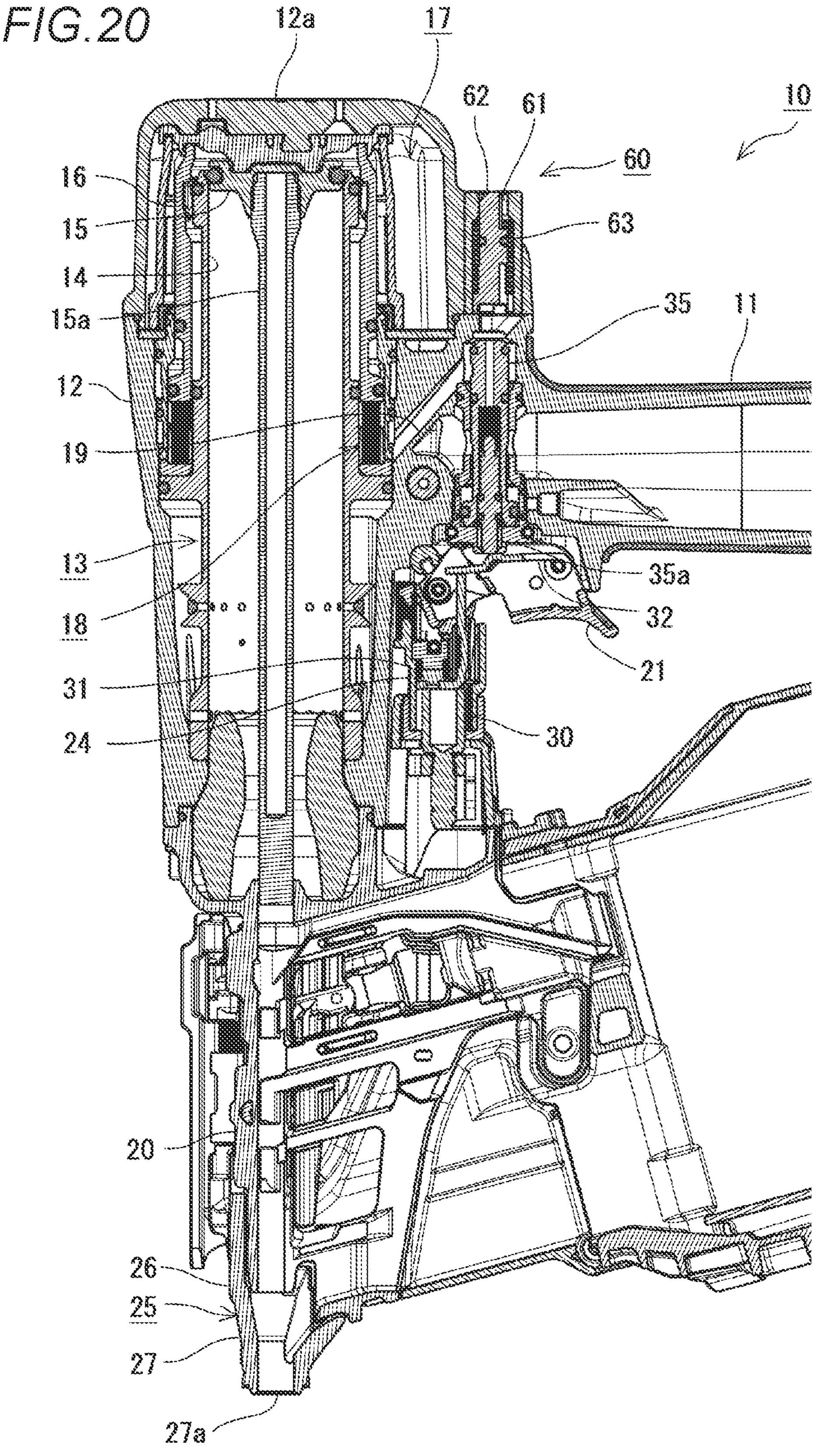
FIG. 20 is a partially enlarged view of the driving tool used for describing the third modification, which is a diagram when a trigger lever is operated in a sign on state.

In the normal state, as illustrated in FIG. 19, the lock valve portion 60 is opened, and the exhaust passage 61 is not closed. In such a normal state, when the valve stem 62 is in the sign on state and the trigger lever 21 is pulled, as illustrated in FIG. 20, the valve stem 35*a* is pushed and the pilot valve 35 operates, so that the air chamber 18 is allowed to communicate with the outside. Accordingly, the compressed air stored in the air chamber 18 is released and the pressure is reduced, and as illustrated in FIG. 21, the main valve portion 16 operates to perform the driving operation.

Figure 22:
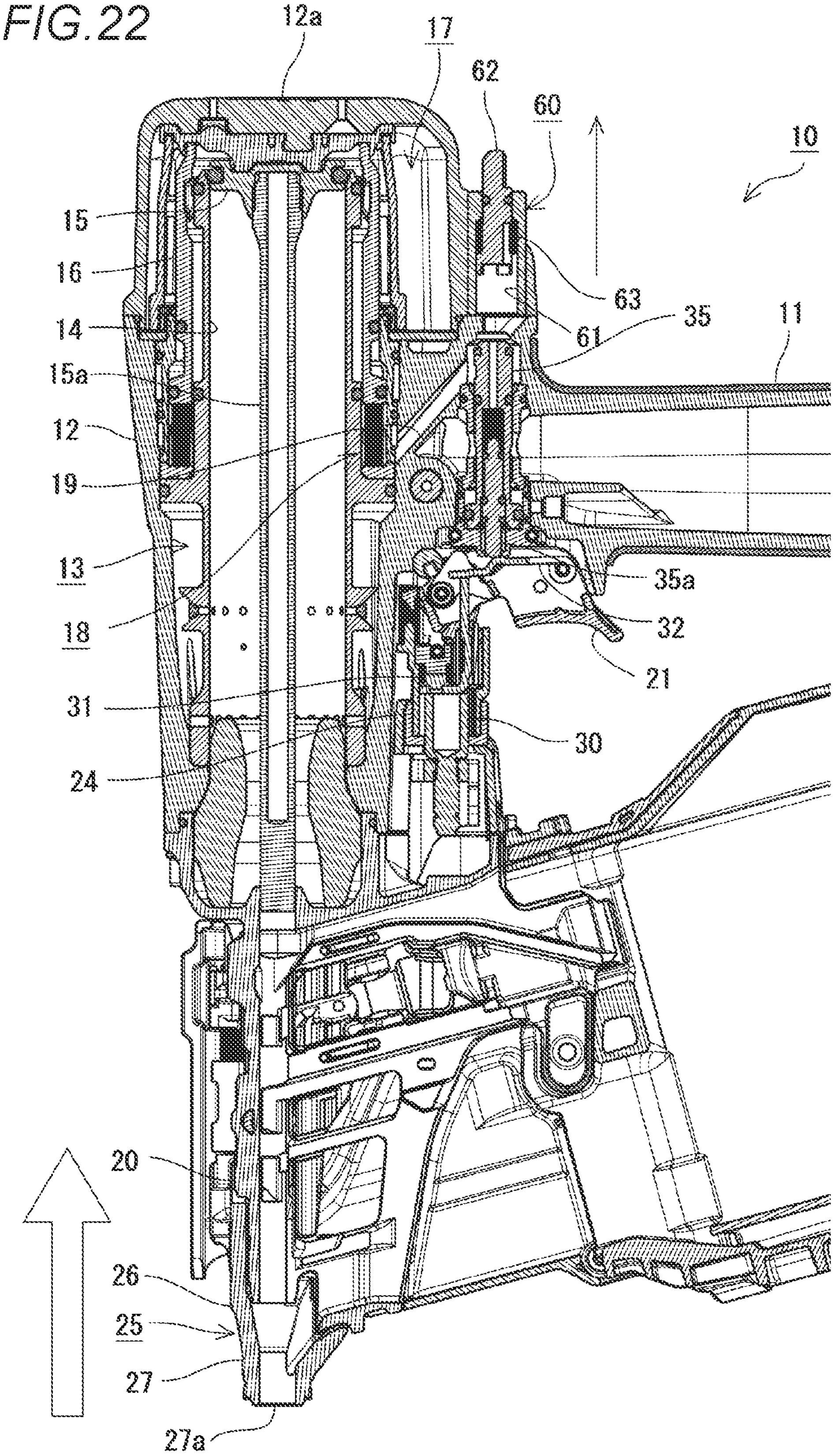
FIG. 22 is a partially enlarged view of the driving tool used for describing the third modification, which is a diagram when an inertial force is generated in a first direction.

On the other hand, when an inertial force is generated upward, as illustrated in FIG. 22, the exhaust passage 61 (the air flow path 19) is closed by the valve stem 62 moving upward by a predetermined amount. Therefore, even when the valve stem 35*a* of the pilot valve 35 is pushed in unintentionally, the compressed air stored in the air chamber 18 does not escape and the pressure does not decrease. Accordingly, the main valve portion 16 does not activate and does not perform the driving operation. In this way, when an inertial force that causes the contact arm 26 to move upward is generated, the driving portion 13 is brought into the non-driving state in which the driving portion 13 does not operate.

As described above, the present embodiment includes the valve stem 62 (a movable portion) that starts moving independently of the contact portion 25 when an inertial force is generated upward (in the first direction), and by the valve stem 62 moving when an inertial force is generated upward, the driving portion 13 is brought into the non-driving state in which the driving portion 13 does not operate. That is, the valve stem 62 is used to implement a restricting portion that restricts the driving operation performed by the driving portion 13 when an inertial force is generated in the first direction. Therefore, even when an inertial force that causes the contact arm 26 to move in the operation direction is generated, the safety of the driving tool 10 can be ensured. Since it is unnecessary to increase a spring load of the contact arm 26 or to slow down the reaction of the main valve portion 16, there is no bad influence on the operability of the user.

Specifically, the driving portion 13 includes the main chamber 17 (a first air chamber), the striking piston 15 configured to drive a fastener by being supplied with air from the main chamber 17 via a first flow path, the main valve portion 16 (a first valve) configured to open and close the first flow path, the air chamber 18 (a second air chamber) configured to store air to be applied in a direction in which the main valve portion 16 is closed, the air flow path 19 (a second flow path) configured to allow the air chamber 18 to communicate with an outside of the tool, and the lock valve portion 60 (a second valve) configured to open and close the air flow path 19. When an inertial force is generated upward (in the first direction), the restricting portion throttles or closes the air flow path 19, thereby preventing the discharge of air from the air chamber 18. In this way, the pressure inside the air chamber 18 is not decreased by the valve stem 62 throttling or closing the air flow path 19 when an inertial force is generated upward, and thus the main valve portion 16 cannot operate, and the driving portion 13 can be prevented from activating when an inertial force is generated upward.

In the present embodiment, the air flow path 19 is completely blocked by the seal portion 62*a* of the valve stem 62, but the valve stem 62 may not completely block the air flow path 19. That is, the valve stem 62 (the movable portion) may throttle or close the air flow path 19 by moving upward (in the first direction), and may open the air flow path 19 by moving downward (in a second direction). For example, the valve stem 62 may delay the exhaust of the air chamber 18 by reducing a cross-sectional area of the air flow path 19 when an inertial force that causes the contact arm 26 to move in the operation direction is generated. By delaying the exhaust of the air chamber 18, a speed of the decrease in the pressure of the air chamber 18 becomes slow, and an operation timing of the main valve portion 16 can be delayed. According to such a configuration, even when an inertial force that causes the contact arm 26 to move in the operation direction is generated, the contact arm 26 returns to the sign off state before the pressure of the air chamber 18 decreases to the pressure at which the main valve portion 16 operates, and thus the main valve portion 16 can be prevented from operating. However, compared with such a configuration, it is more preferable to completely block the air flow path 19.

What is claimed is:

1. A driving tool for driving a fastener to a fastening target object, comprising:

a contact arm capable of moving in a first direction by being brought into contact with and pressed against the fastening target object;

a driving portion configured to start a driving operation of the fastener on condition that the contact arm moves by a predetermined amount in the first direction; and a restricting portion configured to restrict the driving operation performed by the driving portion by abutting on the contact arm such that the contact arm is restricted from moving by the predetermined amount, wherein the restricting portion includes a movable portion configured to move in the first direction, and a guide portion configured to guide the movable portion in a direction in which the movable portion abuts on a side portion of the contact arm, the guide portion protrudes toward a lateral side of the contact arm and has an inclined surface that inclines to approach the contact arm as the inclined surface extends in the first direction, and the movable portion is configured to restrict the contact arm from moving in the first direction by moving along the inclined surface and being guided to the lateral side of the contact arm when an inertial force is generated in the first direction.

2. The driving tool according to claim 1, wherein the contact arm includes an engagement portion configured to engage with the movable portion at a portion where the movable portion abuts on the contact arm.

3. The driving tool according to claim 2, wherein the engagement portion has a concave shape formed on a surface of the contact arm.

4. The driving tool according to claim 1, wherein the restricting portion includes a biasing portion configured to bias the movable portion in a second direction opposite to the first direction.

5. A driving tool for driving a fastener to a fastening target object, comprising:

a contact arm capable of moving in a first direction by being brought into contact with and pressed against the fastening target object;

a driving portion configured to start a driving operation of the fastener on condition that the contact arm moves by a predetermined amount in the first direction; and a restricting portion configured to restrict the driving operation performed by the driving portion when an inertial force is generated in the first direction, wherein the restricting portion includes a weight portion positioned on one end side of the restricting portion, and an abutting portion positioned on the other end side of the restricting portion, when the inertial force is generated in the first direction, the weight portion rotates in the first direction and the abutting portion rotates in a direction approaching the contact arm around a shaft portion positioned between the weight portion and the abutting portion and orthogonal to the first direction as a fulcrum, the abutting portion is configured to abut on the contact arm by rotating in the direction approaching the contact arm, and the restricting portion is configured to abut on the contact arm from above when the inertial force is generated in the first direction.

6. The driving tool according to claim 5, wherein the abutting portion is configured to rotate in a direction approaching a side portion of the contact arm.

7. The driving tool according to claim 5, further comprising:

a lever configured to abut on the contact arm from above, and to start the driving operation of the fastener when the contact arm moves in the first direction by the predetermined amount, wherein the restricting portion is configured to abut on the contact arm from above via the lever when the inertial force is generated in the first direction.

8. The driving tool according to claim 7, wherein the restricting portion includes a weight portion positioned on one end side of the restricting portion, and an abutting portion positioned on the other end side of the restricting portion, when the inertial force is generated in the first direction, the weight portion rotates in the first direction and the abutting portion rotates in a direction approaching the contact arm around a shaft portion positioned between the weight portion and the abutting portion and orthogonal to the first direction as a fulcrum, and the abutting portion is configured to abut on the contact arm from above via the lever by rotating in the direction approaching the contact arm.

9. A driving tool for driving a fastener to a fastening target object, comprising:

a contact arm capable of moving in a first direction by being brought into contact with and pressed against the fastening target object;

a driving portion configured to start a driving operation of the fastener on condition that the contact arm moves by a predetermined amount in the first direction; and a restricting portion configured to restrict the driving operation performed by the driving portion when an inertial force is generated in the first direction, wherein the driving portion includes a first air chamber, a striking piston configured to drive the fastener by supplying air from the first air chamber via a first flow path, a first valve configured to open and close the first flow path, a second air chamber configured to store air to be applied in a direction in which the first valve is closed, a second flow path configured to allow the second air chamber to communicate with an outside of the driving tool, and a second pilot valve configured to open and close the second flow path, and a second valve configured to open and close the second flow path at a different position from the pilot valve, the pilot valve is configured to open and close the first valve by opening and closing the second flow path, the second valve includes a movable portion configured to move in the first direction, and the restricting portion is configured to prevent discharge of air from the second air chamber by throttling or closing the second flow path in response to movement of the driving portion in the first direction when the inertial force is generated in the first direction.

10. The driving tool according to claim 9, wherein when a direction opposite to the first direction is defined as a second direction, the restricting portion includes a movable portion configured to move in the first direction and the second direction, and a biasing portion configured to bias the movable portion in the second direction, and the movable portion is configured to throttle or close the second flow path by moving in the first direction, open the second flow path by moving in the second direction, and move in the first direction against a biasing force of the biasing portion when the inertial force is generated in the first direction.

* * * * *